United States Patent
Chion et al.

(10) Patent No.: US 9,014,117 B2
(45) Date of Patent: Apr. 21, 2015

(54) RESOURCE ALLOCATION IN WIRELESS MULTI-HOP RELAY NETWORKS

(71) Applicant: ZTE (USA) Inc., Morristown, NJ (US)

(72) Inventors: Hua Mary Chion, Belle Mead, NJ (US); Jerry Pak Lup Chow, San Diego, CA (US); Hongyun Qu, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 62 days.

(21) Appl. No.: 13/723,127

(22) Filed: Dec. 20, 2012

(65) Prior Publication Data

US 2013/0107797 A1     May 2, 2013

Related U.S. Application Data

(62) Division of application No. 12/168,859, filed on Jul. 7, 2008, now Pat. No. 8,340,029.

(60) Provisional application No. 60/948,191, filed on Jul. 6, 2007.

(51) Int. Cl.
| | | |
|---|---|---|
| H04W 4/00 | (2009.01) | |
| H04W 72/04 | (2009.01) | |
| H04W 72/12 | (2009.01) | |
| H04W 88/04 | (2009.01) | |
| H04B 7/26 | (2006.01) | |
| H04W 16/26 | (2009.01) | |
| H04W 84/04 | (2009.01) | |

(52) U.S. Cl.
CPC .......... *H04W 72/04* (2013.01); *H04W 72/1289* (2013.01); *H04W 88/04* (2013.01); *H04B 7/2606* (2013.01); *H04W 16/26* (2013.01); *H04W 72/0453* (2013.01); *H04W 84/047* (2013.01)

(58) Field of Classification Search
CPC .............................. H04W 88/04; H04W 72/04
USPC ........................ 370/329, 315, 312; 455/442
See application file for complete search history.

(56) References Cited

U.S. PATENT DOCUMENTS

| | | | | |
|---|---|---|---|---|
| 2008/0062904 | A1* | 3/2008 | Tzu-Ming | 370/312 |
| 2008/0108355 | A1* | 5/2008 | Oleszcsuk | 455/442 |
| 2008/0259857 | A1* | 10/2008 | Zheng | 370/329 |
| 2008/0285501 | A1* | 11/2008 | Zhang et al. | 370/315 |

FOREIGN PATENT DOCUMENTS

WO    WO 2007/036166    *  4/2007

* cited by examiner

*Primary Examiner* — Albert T Chou
(74) *Attorney, Agent, or Firm* — Perkins Coie LLP

(57) ABSTRACT

Technologies that, among other things, provide resource allocation in multi-hop wireless networks with relay stations and can be used to supply information to link data packets with a respective resource allocation.

27 Claims, 15 Drawing Sheets

| RHDR MR INDICATION = 1 | MR S-HDR CONTINUATION = 1 | MR S-HDR CONTINUATION = 1 | MR S-HDR CONTINUATION = 0 | PAYLOAD |

FIG. 7

RESOURCE ALLOCATION IN WIRELESS MULTI-HOP RELAY NETWORKS

PRIORITY CLAIM AND CROSS-REFERENCE TO RELATED APPLICATION

This patent application is a divisional of and claims priority to U.S. patent application Ser. No. 12/168,859, filed on Jul. 7, 2008, which claims the benefit of priority of U.S. Provisional Application No. 60/948,191, filed on Jul. 6, 2007 The entire contents of the before-mentioned patent applications are incorporated by reference as part of the disclosure of this application.

BACKGROUND

This patent application relates to wireless communications.

Wireless communication systems can include a network of one or more base stations and one or more relay stations to communicate with wireless devices. Each base station and relay station emits radio signals that carry data such as voice data and other data content to wireless devices. These radio signals can include additional information for communication management functions. Such additional information can include information to allow a wireless device to identify a cell sector of a base station and/or information to synchronize signaling in time and frequency. A wireless device may process the communication management information first before processing payload data.

Communication systems based on the orthogonality of frequencies of multiple subcarriers such as Orthogonal Frequency-Division Multiplexing (OFDM) and Orthogonal Frequency-Division Multiple Access (OFDMA) can achieve a number of potential technical advantages in wideband wireless communications such as resistance to multipath fading and interference. In wireless communication systems, a base station (BS) communicates with wireless device(s) in a service area. Wireless devices can include a mobile subscriber station (MSS), wireless station, or mobile station (MS).

A service area can be divided into multiple cells. The cells can be further divided into cell sectors. A BS's location can define a respective cell's service area in which the base station transmits to a wireless device via downlink (DL) radio signals. A wireless device can transmit information to a base station via uplink (UL) radio signals.

Multiple factors may limit the radio coverage area of a network of fixed base stations. Various structures may block the radio signals of one or more base stations. For example, a tall building may shield a particular area from a base station's radio signal, thus creating an undesired situation referred to as shadowing. At the edge of a cell, the signal strength can weaken. A weaker signal can lead to increased error rates of transmitted information or received information.

Adding additional base stations or relay stations can mitigate these limiting factors. Relay stations (RS) can be deployed among fixed base stations to relay communication signals between a mobile station and a base station. Relay stations can extend the coverage and improve the communication capacity and quality of a base station. A RS can be a fixed transceiver or a mobile transceiver station depending on the specific conditions for deploying such relay stations. A mobile station's signals can "hop" through one or more relay stations before reaching a serving base station. A mobile station can communicate with a relay station or directly with a base station.

A multi-hop relay wireless communication system, such as a multi-hop relay network in accordance with IEEE 802.16j, can include one or more MR base stations (MR-BS) and one or more relay stations. Multi-hop relay networks can operate in one of multiple modes, such as those modes defined by the IEEE 802.16j standard, to provide enhanced coverage and service to wireless devices. In these systems, radio resources, such as radio links and transmission slots on those radio links, can be scheduled and allocated centrally or distributed.

With distributed scheduling, the MR-BS and the relay stations independently determine and schedule the allocations of radio resources of their own radio links or channels and generate signaling messages according to the individual scheduling results.

With centralized scheduling, the MR-BS is responsible for performing resource allocation and scheduling of radio links under control of the MR-BS, such as radio links between BS and RS, RS and RS, BS and MS, and RS and MS. The MR-BS transmits an output of the scheduling to the relay stations. For example, a BS schedules radio link resources including access links of the BS (e.g., a link between a BS and a MS), relay links of the BS (e.g., a link between a BS and a RS), and access links and relay links of subordinate RSs. The BS can inform each subordinate RS of the scheduling result by using messages such as Mobile Application Part (MAP) messages.

SUMMARY

This patent application describes technologies that, among other things, provide resource allocation in multi-hop wireless networks with relay stations and can be used to supply information to link data packets with a respective resource allocation.

Methods for mapping of resource allocation with data packets in a wireless communication network comprising base stations and relay stations can include operating the wireless communication network in a centralized scheduling mode to enable a base station with one or more relay stations to allocate and schedule resource of radio links from the base station to the one or more relay stations, from the one or more relay stations to a mobile station, and from the base station to a mobile station; operating a base station to include mapping references to resource allocation with relay data packets when sending relay data packets to a first relay station; and operating the first relay station to use the mapping references to ascertain the resource allocation for the relay data packets and transmit the relay data packets based on the ascertained resource allocation. Other implementations can include corresponding systems, apparatus, and computer program products.

Methods for mapping of resource allocation with data packets in a wireless communication network comprising base stations and relay stations can include operating the wireless communication network in a centralized scheduling mode to enable a base station with one or more relay stations to allocate and schedule resource of radio links from the base station to the one or more relay stations, from the one or more relay stations to a mobile station, and from the base station to a mobile station; operating a base station to include mapping references of data packets with resource allocation signaling that is separate from data packets to send a resource allocation to a first relay station; and operating the first relay station to use the mapping references to ascertain respective data packets to be transmitted based on the resource allocation. Other implementations can include corresponding systems, apparatus, and computer program products.

Methods for associating data packets with radio link resource allocations in a wireless network can include scheduling radio links for transmitting data packets to one or more mobile stations via one or more relay stations, each radio links provides a wireless connection between two radio stations, the radio stations comprise a base station, the one or more relay stations, and the one or more mobile stations, wherein the one or more relay stations comprise a first relay station; determining a resource allocation, based on the scheduling, that at least allocates bandwidth on one of the radio links for a transmission of one or more of the data packets; generating one or more mapping references for one or more of the data packets associated with the resource allocation, each mapping reference links at least one data packet to a respective allocation of bandwidth; and transmitting the resource allocation, one or more mapping references, and data packets to the first relay station. The first relay station can re-transmit the data packets in accordance with the resource allocation and the one or more mapping references. A radio station such as a base station can perform these methods. Other implementations can include corresponding systems, apparatus, and computer program products.

These, and other aspects, can include one or more of the following features. The resource allocation can specify allocations of bandwidth for respective data packets in an initial order. The first relay station can receive the transmitted data packets in a receive order. The resource allocation and the one or more mapping references can compensate for a receive order that differs from the initial order. The resource allocation and the one or more mapping references can compensate for one or more missing data packets at the first relay station. The transmitting can include transmitting the data packets separately from the one or more mapping references and the resource allocation. Each of the mapping references can include a connection identifier that identifies a connection and a frame number that identifies a data packet associated with the connection. Each of the mapping references can also include a value reflective of a total amount of data allocated for the connection. The resource allocation can be transmitted separately from the one or more mapping references and the data packets. At least one of the mapping references can be transmitted with at least one of the data packets. The one or more mapping references can include a target transmission frame index that identifies a transmission slot for a subsequent transmission of a data packet and an allocation index that identifies an allocation of bandwidth associated with a data packet. The transmitting can include transmitting a first mapping reference and a second mapping reference with a first data packet, wherein the first mapping reference identifies an allocation of bandwidth for the first data packet on a first radio link, wherein the second mapping reference identifies an allocation of bandwidth for the first data packet on a second radio link, with the second radio link being subsequent to the first radio link in a transmission of the first data packet to a mobile station. The transmitting can include transmitting a first flag with the at least one of the data packets, the first flag indicating a presence of a mapping reference. The transmitting can include transmitting a second flag with the at least one of the data packets, the second flag indicating a presence of an additional mapping reference. The resource allocation can be transmitted separately from the one or more mapping references and the transmitting can include transmitting two or more of the data packets destined for a mobile station with one of the mapping references that links the two or more data packets to the resource allocation.

Methods for receiving data over a first radio link and subsequently transmitting data over one or more second radio links can include receiving one or more resource allocations, one or more mapping references, and multiple data packets, wherein the one or more resource allocations comprise an allocation of bandwidth on a radio link, wherein the mapping references comprise information that links a data packet with an allocation of bandwidth in a resource allocation, the data packets destined for one or more mobile stations; processing one of the data packets by locating a respective mapping reference; identifying a resource allocation associated with the processed data packet by using the respective mapping reference; and transmitting the processed data packet over a radio link in accordance with the identified resource allocation. A radio station such as a relay station can perform these methods. Other implementations can include corresponding systems, apparatus, and computer program products.

These, and other aspects, can include one or more of the following features. The resource allocation and the one or more mapping references can compensate for one or more missing data packets. The identified resource allocation can specify allocations of bandwidth for respective data packets in an initial order. The multiple data packets can be received in a receive order. The identified resource allocation and the one or more mapping references can compensate for a receive order that differs from the initial order. The receiving can include receiving the mapping references with the resource allocations, wherein the mapping references comprise a connection identifier that identifies a connection and a received frame number that identifies at least one data packet associated with the connection and receiving the multiple data packets separately from receiving the mapping references. The respective mapping reference can include an allocation value reflective of a total amount of data allocated for the connection, the respective mapping reference being associated with the multiple data packets. The methods can also include identifying additional data packets that are associated with the respective mapping reference; and transmitting the identified data packets in a first-in-first-out mode until the allocation value is reached. The processing can include accessing a received frame number associated with the processed data packet; and comparing the received frame number with the received frame number of the respective mapping reference. The receiving can include receiving the mapping references with the data packets, wherein the mapping references comprise a target transmission frame index that identifies a transmission slot for a future transmission of a data packet and an allocation index that identifies an allocation of bandwidth associated with a data packet, wherein the resource allocation is received separately from the mapping references. The transmitting can include transmitting the processed data packet in the target transmission frame index specified by the respective mapping reference. The receiving the mapping references comprises receiving a first mapping reference and a second mapping reference with the first mapping reference and the second mapping reference being associated with the processed data packet, wherein the first mapping reference defines the respective mapping reference. The transmitting can include transmitting the processed data packet to a relay station; and transmitting the second mapping reference with the processed data packet, wherein the second mapping reference mapping reference is used by the relay station to forward the processed data packet to a mobile station in accordance with the identified resource allocation.

This, and other aspects, can include one or more of the following features. The first transmitting can include transmitting the resource allocation with at least one of the mapping references; and transmitting the data packets separately from the resource allocation and the one or more mapping references. The mapping references can include a connection identifier that identifies a connection and a frame number that identifies a data packet associated with the connection. The mapping references can also include a value reflective of a total amount of data allocated for the connection. The first transmitting can include transmitting at least one of the mapping references with at least one of the data packets. The resource allocation can be transmitted separately from the one or more mapping references and the one or more data packets. The one or more mapping references can include a target transmission frame index that identifies a transmission slot for a subsequent transmission of a data packet and an allocation index that identifies an allocation of bandwidth associated with a data packet. The first transmitting can include transmitting a first mapping reference and a second mapping reference with a first data packet, wherein the first mapping reference identifies an allocation of bandwidth for the first data packet on a first radio link, wherein the second mapping reference identifies an allocation of bandwidth for the first data packet on a second radio link, with the second radio link being subsequent to the first radio link in a transmission of the first data packet to a mobile station. The first transmitting can include transmitting a first flag with the at least one of the data packets, the first flag indicating a presence of a mapping reference. The first transmitting can include transmitting a second flag with the at least one of the data packets, the second flag indicating a presence of an additional mapping reference. The first transmitting can include transmitting the resource allocation separately from the one or more mapping references and the data packets; and transmitting two or more of the data packets destined for a mobile station with one of the mapping references that links the two or more data packets to the transmitted resource allocation.

A system for wireless data communication can include a relay station in communication with one or more mobile stations, the relay station can include a first communication interface and a first processor communicatively coupled with the first communication interface; and a base station in communication with the relay station, the base station can include a second communication interface and a second processor communicatively coupled with the second communication interface. The second processor can be configured to perform operations that include scheduling radio links for transmitting data packets to the one or more mobile stations via the relay station; determining a resource allocation, based on the scheduling, that allocates bandwidth on the radio links to transmit one or more of the data packets; generating one or more mapping references for one or more of the data packets associated with the resource allocation, each mapping reference links at least one data packet to a respective allocation of bandwidth; and first transmitting the resource allocation, one or more mapping references, and data packets to the relay station. The first processor can be configured to perform operations that include receiving the resource allocation, the one or more mapping references, and multiple data packets; processing one of the received data packets by locating a respective mapping reference; identifying a resource allocation associated with the processed data packet by using the respective mapping reference; and second transmitting the processed data packet over a radio link in accordance with the identified resource allocation.

Particular implementations of the subject matter described in this patent application can be implemented to realize one or more of the following potential advantages. Mapping reference can increase bandwidth efficiency. Mapping reference can associate data packets with respective resource allocations regardless of how the data packets are sent with respect to the resource allocations. A resource allocation and one or more mapping references can compensate for a receive order of the transmitted data packets that differs from an ordering of bandwidth allocations in a resource allocation order in a resource allocation, e.g., out-of-order delivery of data packets or missing data packets. The mapping references can allow a relay station to detect missing data packets and continue to transmit received data packets in accordance with the resource allocation associated with the received data packets. A resource allocation and one or more mapping references can compensate for missing data packets at a relay station. The methods can grant a BS additional flexibility in scheduling access links and relay links by eliminating the need of sequential delivery of data packets across radio links.

The details of multiple implementations are set forth in the accompanying drawings and the description below.

BRIEF DESCRIPTION OF THE DRAWINGS

FIG. 7 shows an example of indication flag and continuation flags in a header.

Like reference symbols in the various drawings indicate like elements.

DETAILED DESCRIPTION

Figure 1A:
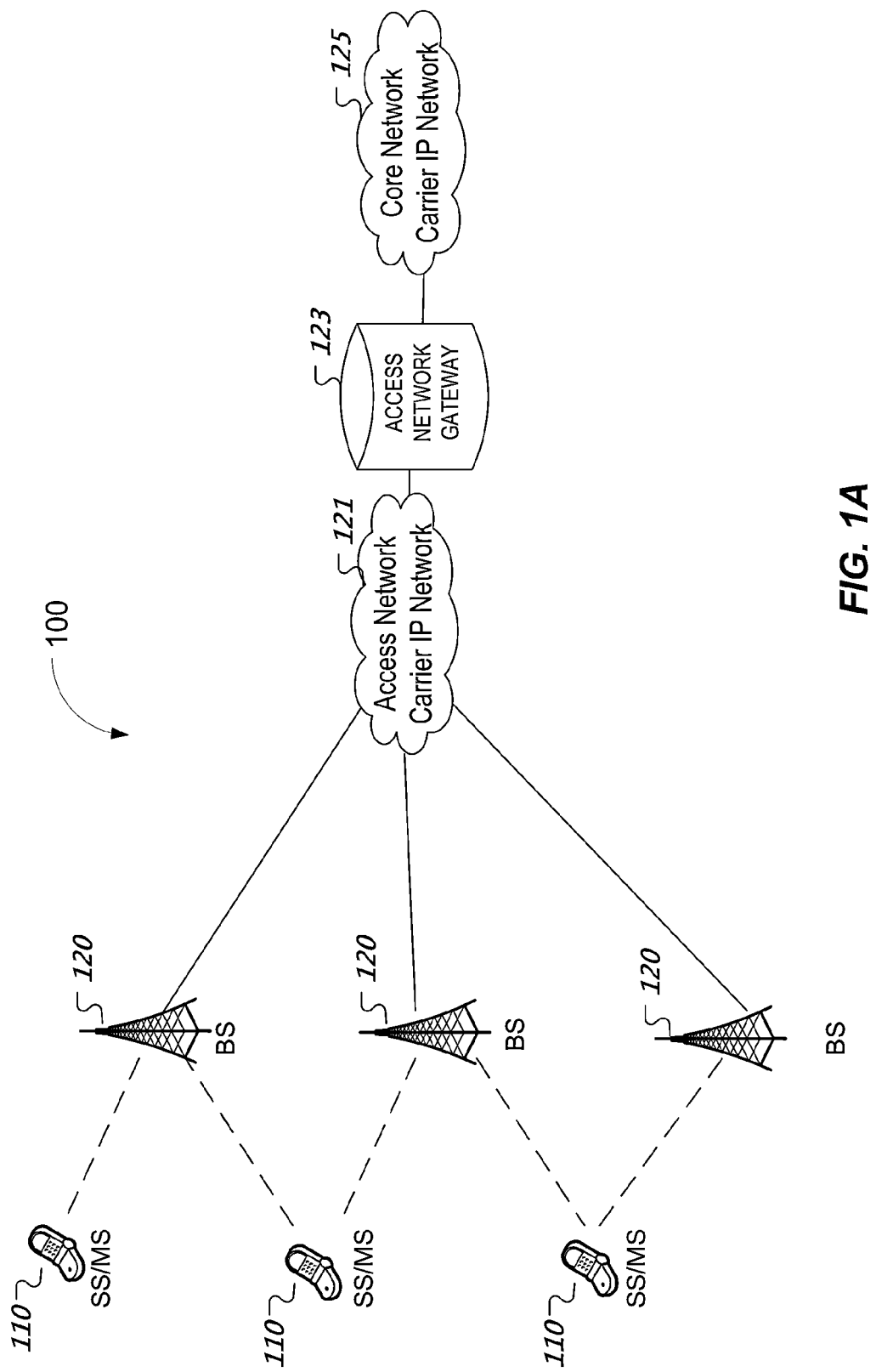
FIG. 1A shows an example of a wireless communication system.

Data packets and signaling messages can be transmitted through separate channels such as data and control channels. Separately transmitted messages can result in asynchronously received messages by relay stations. Resource allocation information can therefore become separated from a data packet related to that resource allocation information. For example, a RS can receive MAP messages and data packets over different connections asynchronously. Events such as loss of data burst/packets and/or out-of-order delivery of same can occur over radio links. These events can lead to a receive order of data packets that differs from an ordering of bandwidth allocations in a resource allocation. This patent application addresses these issues by introducing mapping references that link data packets to respective resource allocations in order to transmit the data packets in accordance with respective resource allocations.

Data can be forwarded through a multi-hop wireless relay network using one or more data relay modes. In one of the data relay modes, a tunnel can be created between a MR base station and a relay station. Data packets sent through the tunnel can be encapsulated with a tunnel packet header. Multiple data packets can be concatenated and encapsulated by a tunnel header. In another data relay mode, each data packet is forwarded by a MR-BS and one or more relay stations based on connection identifiers. A connection identifier represents a connection between a BS and a MS. Each relay station can maintain a routing table based on the connection identifiers between a BS and a MS. In the latter relay mode, a tunnel packet header is not required. This patent application describes multiple mapping reference implementations to address multiple relay modes.

Operating under a centralized scheduling mode, a MR-BS can determine radio resource allocations for the MR-BS and relay stations that relay signals between the MR-BS and MSs. The resource allocations can include an allocation on a radio link such as a transmission slot on that radio link. In addition, the MR-BS can generate signaling messages containing the scheduling results and can transmit the signaling messages to each relay station. Different data relay modes can require different mechanisms that provide mapping references between data packets and resource allocations to maximize bandwidth efficiency.

In some implementations, methods and systems for allocating radio link resource in a wireless multi-hop relay network can include operating one or more base stations to provide a centralized scheduling control with a mapping reference for resource allocation to include a connection identifier, total data allocated, and a received frame number. These methods and systems also include operating one or more relay stations to use the connection identifier to identify a connection for transmitting data based on the resource allocation and a received frame number to identify data packets for transmission over the connection.

FIG. 1A shows an example of a wireless communication system. The system can be in accordance with standards such as OFDM or OFDMA. System 100 can include a network of base stations (BSs) 120 that are spatially distributed in a service area to form a radio access network for communicating with wireless devices such as subscriber stations/mobile stations (SS/MSs) 110.

MS 110 can be a mobile unit or a fixed unit. A fixed unit can be located and/or relocated anywhere within the coverage area of system 100. Fixed unit wireless device can include, for example, desktop computers and computer servers. Mobile units can include, for example, mobile wireless phones, Personal Digital Assistants (PDAs), and mobile computers.

A base station 120 in system 100 can include a radio transceiver. A base station can define a center of a cell and can communicate with a MS in the cell via downlink radio signals and uplink radio signals. Each BS 120 can include directional antennas. Directional antennas produce directional beams to further divide each cell into different sections.

A BS can be connected to a backhaul such as a carrier IP network. For example, system 100 includes a carrier IP network to carry voice and data traffic. The carrier IP network includes an access network 121 and a core network 125. Access network gateway 123 provides an interface between the access network's carrier IP network 121 and the core network's carrier IP network 125.

Figure 1B:
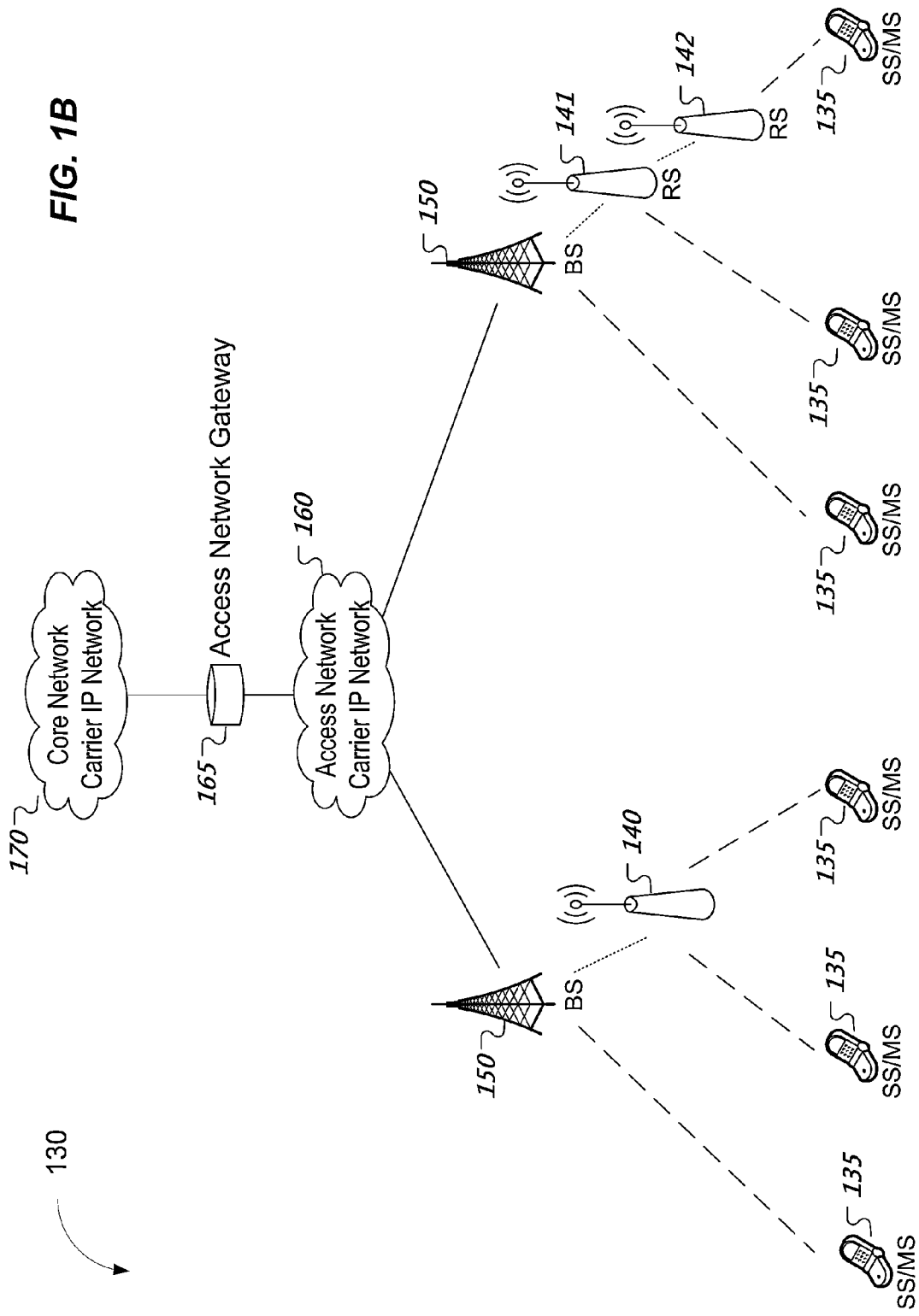
FIG. 1B shows an example of a wireless communication system with multiple relay stations.

FIG. 1B shows an example of a wireless communication system with multiple relay stations. System 130 can operate in accordance with a wireless standard such as OFDM or OFDMA. System 130 can include a network of base stations 150 that communication with subscriber stations/mobile stations (SS/MSs) 135 and relay stations (RSs) 140, 141, 142.

BS 150, in addition to providing direct radio access to MSs 135, can control a network of RSs 140, 141, 142 to increase coverage and capacity. A RS 140, 141, 142 can be a fixed transceiver or a mobile transceiver station depending on the specific conditions for deployment. A RS 140, 141, 142 can provide radio access to the MSs 135 by relaying data streams from the BS 150.

In addition, a RS 141 can provide radio access to another RS 142 by relaying data streams received from BS 150. Each relay station 140, 141, 142 can be a hop in a communication path between a BS 150 and a MS 135. A communication path with multiple relay stations, such as a path traversing RS 141 and RS 142, is known as a multi-hop relay path.

The multi-hop network system 130 can have superordinate base or relay stations and subordinate base or relay stations. In some implementations, a BS can be configured to act as a RS. Relay stations 140, 141 are subordinate to respective BSs 150 because each respective BS 150 is connected to network 160 and acts as the gateway for the relay stations 140, 141. Accordingly, BSs 150 are superordinate to respective relay stations 140, 141. In some implementation, relay stations under the control of a superordinate BS can have superordinate and subordinate relationships with one another. For example, relay station 142 is subordinate to relay station 141. A subordinate RS, such as RS 142, communicates to the BS 150 and the rest of the network through RS 141. RS 141 is the superordinate RS for RS 142. However, RS 141 is subordinate to BS 150. BSs and RSs can be classified into superordinate base stations/relay stations and subordinate base stations and/or relay stations based on their relative relationships.

A BS 150 in system 130 can be connected to a backhaul such as a carrier IP network. For example, system 150 includes a carrier IP network to carry voice and data traffic. The carrier IP network includes an access network 160 and a core network 170. Access network gateway 165 provides an interface between the access network's carrier IP network 160 and the core network's carrier IP network 170.

Systems 100, 130 can use different methods for communicating resource allocations, mapping references, and data packets such as out-of-band signaling and in-band signaling methods. Out-of-band signaling methods can include transmitting a mapping reference separately from a respective data packet. In-band signaling methods can include transmitting a mapping reference with a respective data packet.

Out-of-band signaling can function with multiple relay modes, such as the relay modes presented in this patent application, as well as with uplink transmissions. In some implementations, out-of-band signaling can include mapping references to the data packets in MAP messages along with a resource allocation to identify the proper data packets to be sent using the resource allocation.

In-band signaling can be adaptive in detecting loss of packets and can reduce overhead. In-band signaling can be used in a relay mode that includes MAC layer tunneling with Protocol Data Unit (PDU) encapsulation on downlink transmissions. In some implementations, in-band signaling can include attaching mapping references or a set of mappings associate with a resource allocation found in MAP message to each relay Media Access Control (MAC) PDUs as part of a relay MAC header.

Figure 2A:
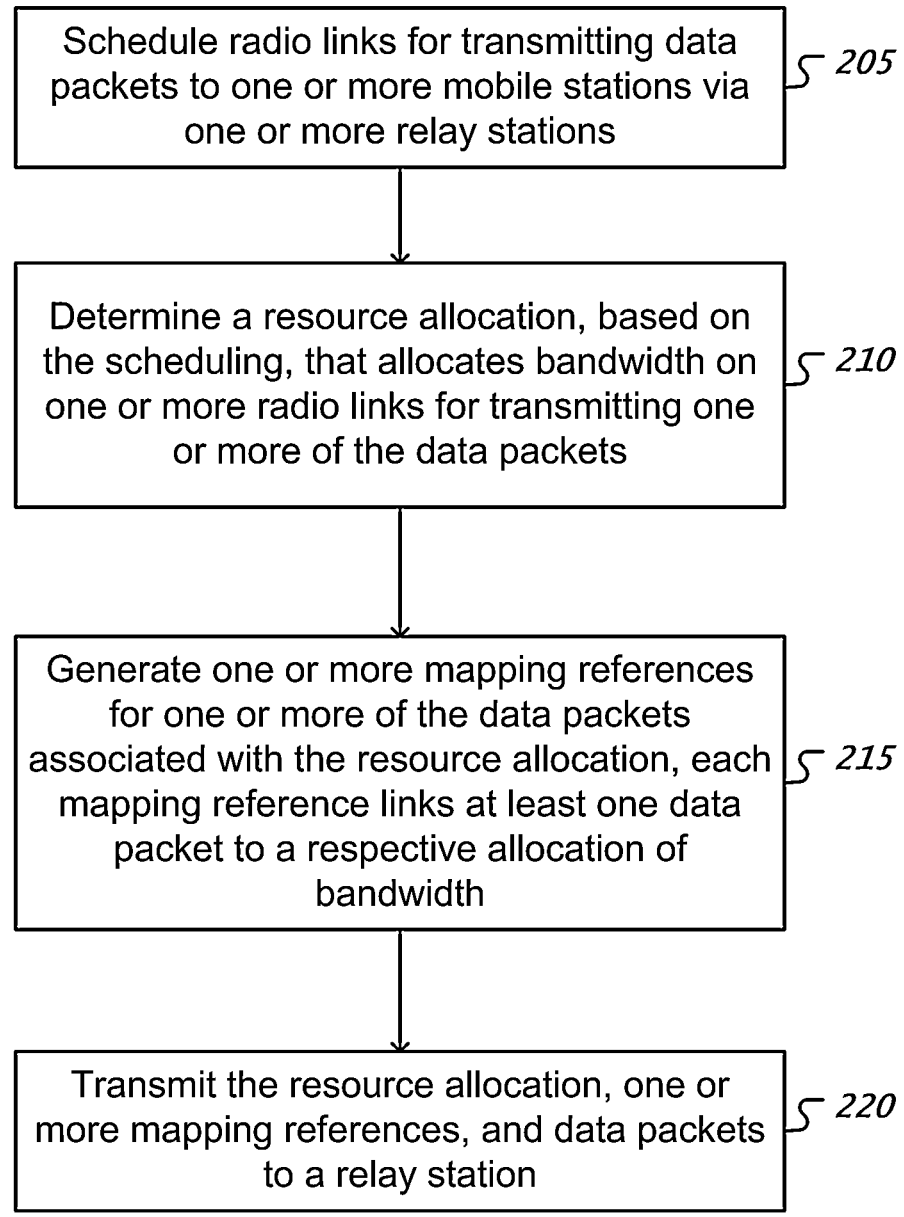
FIG. 2A shows an example of base station operations.

FIG. 2A shows an example of base station operations. A BS can schedule 205 radio links for transmitting data packets to one or more mobile stations via one or more relay stations over one or more radio links. The BS can determine 210 a resource allocation, based on the scheduling, that allocates bandwidth on one or more radio links for transmitting one or more of the data packets. The BS can generate 215 one or more mapping references for one or more of the data packets associated with the resource allocation, each mapping reference links at least one data packet to a respective allocation of bandwidth. The BS can transmit 220 the resource allocation, one or more mapping references, and data packets to a relay station.

Figure 2B:
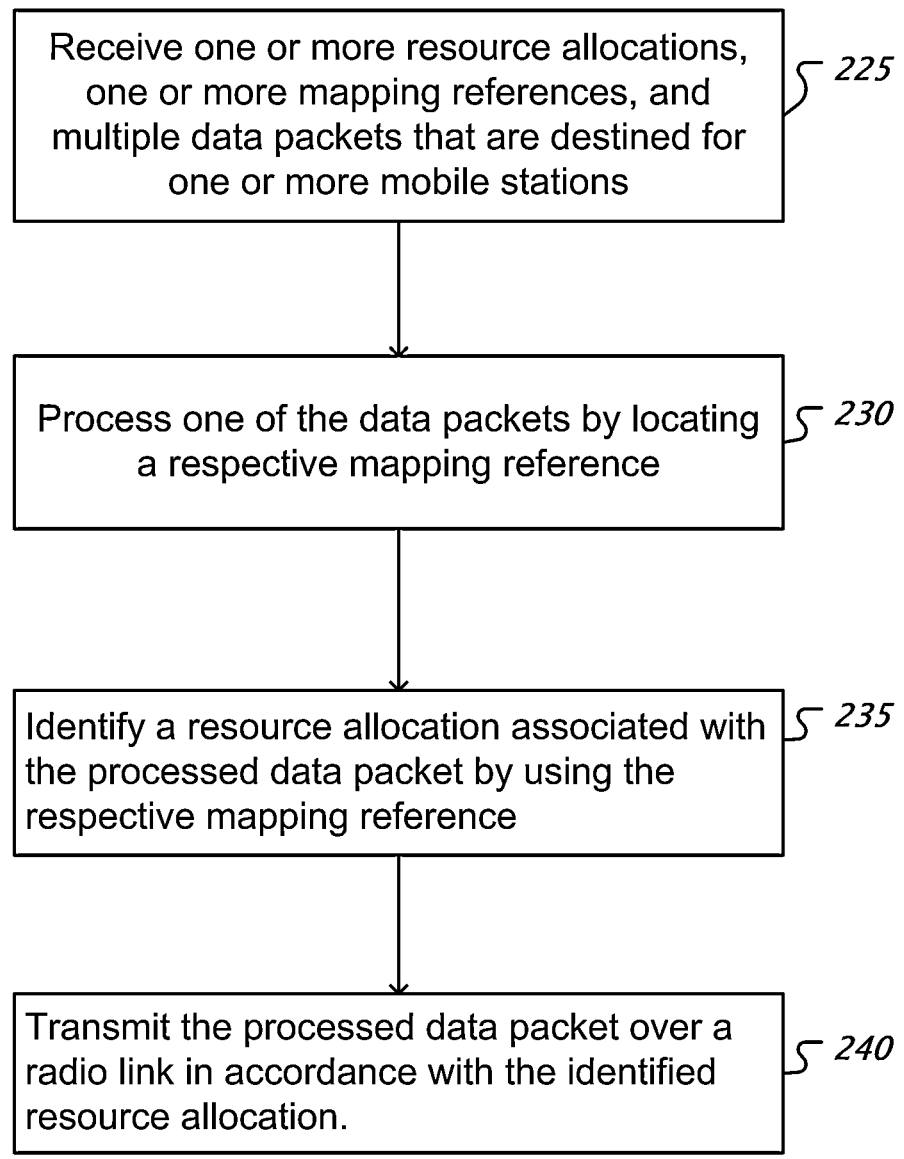
FIG. 2B shows an example of relay station operations.

FIG. 2B shows an example of relay station operations. The RS can receive 225 one or more resource allocations, one or more mapping references, and multiple data packets that are destined for one or more mobile stations. The resource allocations can include an allocation of bandwidth on a radio link. The mapping references can include information that links a data packet with an allocation of bandwidth in a resource allocation. The RS can process 230 one of the data packets by locating a respective mapping reference. The RS can identify 235 a resource allocation associated with the processed data packet by using the respective mapping reference. The RS can transmit 240 the processed data packet over a radio link in accordance with the identified resource allocation.

Figure 2C:
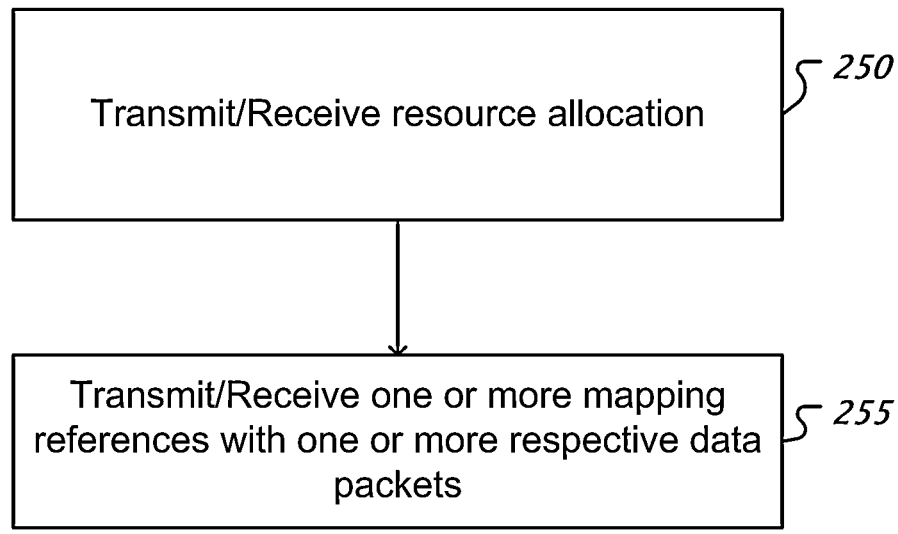
FIG. 2C shows an example of in-band signaling.

FIG. 2C shows an example of in-band signaling. The operations of either FIG. 2A or 2B, such as transmitting 220 and receiving 225, can follow the signaling example of FIG. 2C. A BS/RS can respectively transmit/receive 250 a resource allocation. Then, the BS/RS can respectively transmit/receive 255 one or more mapping references with one or more respective data packets. The BS/RS can repeat transmit/receive 255 as needed.

Figure 2D:
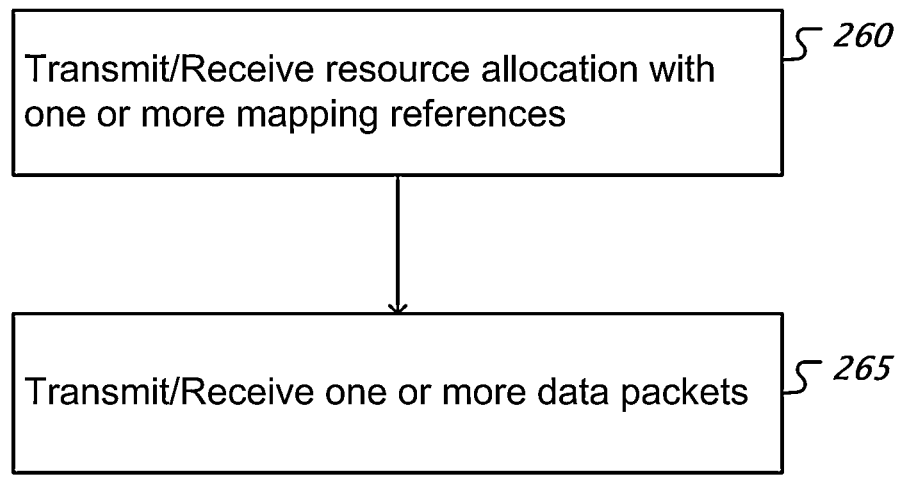
FIG. 2D shows an example of out-of-band signaling.

FIG. 2D shows an example of out-of-band signaling. The operations of either FIG. 2A or 2B, such as transmitting 220 and receiving 225, can follow the signaling example of FIG. 2D. A BS/RS can respectively transmit/receive 260 a resource allocation with one or more mapping references. Then, the BS/RS can respectively transmit/receive 265 one or more data packets.

Figure 3A:
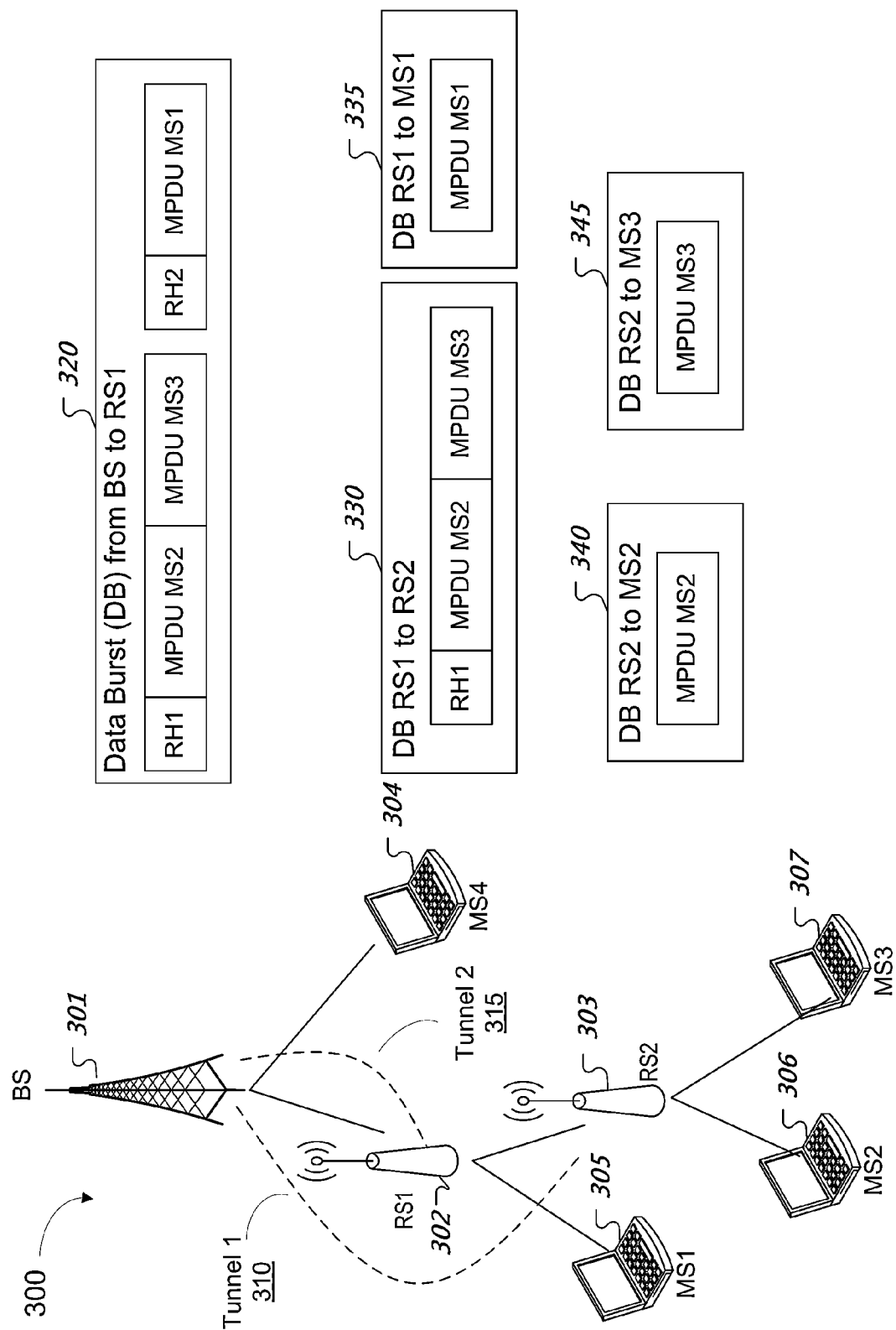
FIG. 3A shows an example of a data relay mode that uses MAC layer tunneling with PDU encapsulation.

FIG. 3A shows an example of a data relay mode that uses MAC layer tunneling with PDU encapsulation. System 300 is multi-hop relay wireless communication system that includes BS 301, and relay stations RS1 302 and RS2 303.

One or more tunnels can be set up from a BS to an access RS. Multiple service flows can be carried by a tunnel, such as tunnel 310, 315. In some implementation, data carried in a tunnel can include a tunnel MAC PDU that encapsulates multiple access link MAC PDUs and/or relay link PDUs with a relay MAC header. A relay MAC header can include a tunnel ID; a relay station can route a tunnel MAC PDU based on the tunnel ID.

In system 300, tunnels can be established to forward data from BS 301 to MSs such as MS1 305, MS2 306, MS3 307, and MS4 304. Tunnel 1 (310) logically connects BS 301 to RS2 303. Tunnel 2 (315) logically connects BS 301 to RS1 302.

FIG. 3A also shows an example of a data burst 320 from BS 301 to RS1 302. A data burst (DB) can be a single transmission. Such a data burst can be defined by one allocation block in a resource allocation message. Multiple MAC data packets or MAC PDUs (MPDUs) can be concatenated into one data burst. Data burst 320 can include traffic for Tunnel 1 (310) and Tunnel 2 (315). For example, data burst 320 can include a relay MPDU with a relay header (RH) for Tunnel 1 (310), e.g., RH1, with data destined for MS2 305 and data destined for MS3 307, e.g., access link MPDU MS2 and MPDU MS3. Also, data burst 320 can include a relay MPDU with a relay header (RH) for Tunnel 2 (315), e.g., RH2, with data destined for MS1 305, such as an access link MPDU.

RS1 302 can transmit multiple data bursts 330, 335. Data burst 330, from RS1 302 to RS2 303, can include a relay MPDU for Tunnel 1 (310). Data burst 335, from RS1 302 to MS1 305, can include a MPDU for MS1 without a relay tunnel header. RS2 303 can transmit data bursts 340, 345 to MS2 306, MS3 307.

Figure 3B:
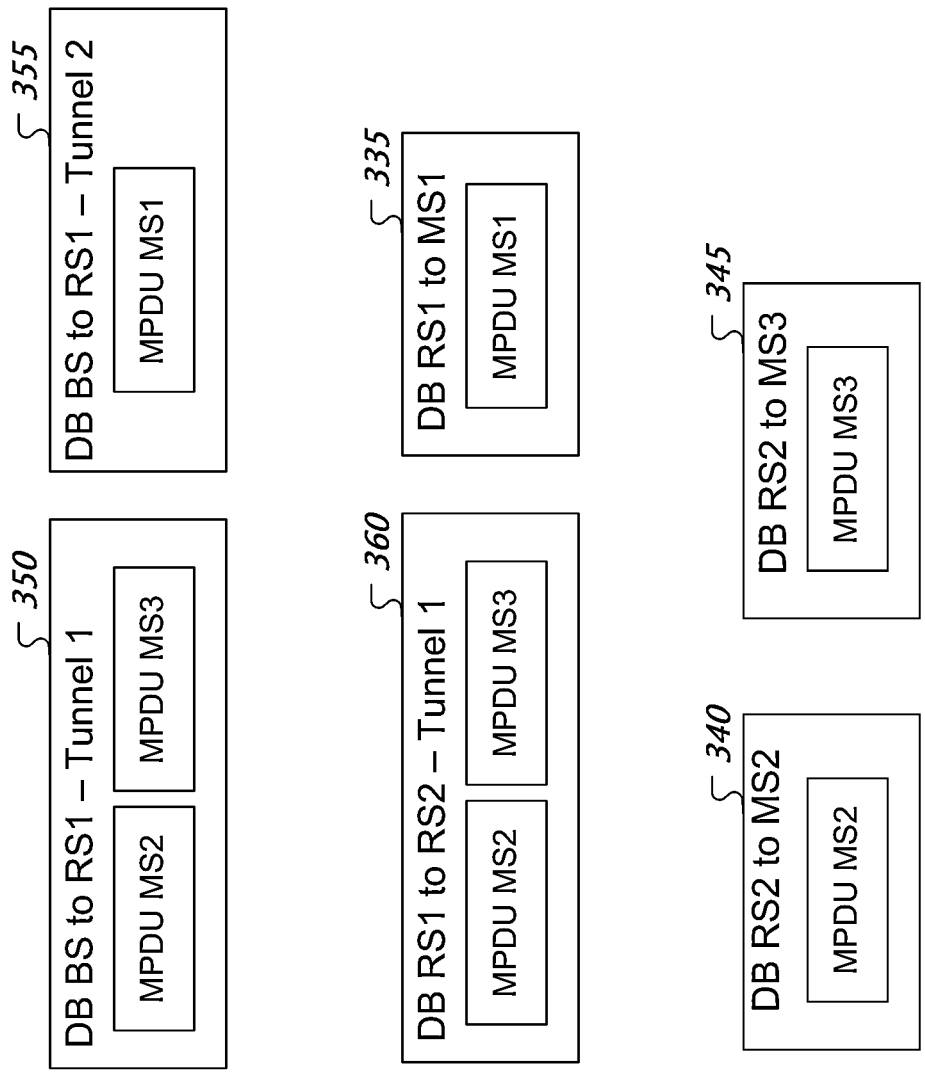
FIG. 3B shows an example of a data relay mode that uses MAC layer tunneling without PDU encapsulation.

FIG. 3B shows an example of a data relay mode that uses MAC layer tunneling without PDU encapsulation. FIG. 3B uses a system similar to system 300. Data Bursts such as tunnel data bursts 350, 355, 360 are per tunnel with the tunnel ID being in a MAP message instead of a MAC header. When a RS receives the data burst allocation signaling, such as MAP messages, the RS can decodes the data burst and can relay the entire data burst according to the tunnel ID retrieved from an allocation signaling message. Such a data burst can include MAC PDUs for the same tunnel transmission.

Figure 4:
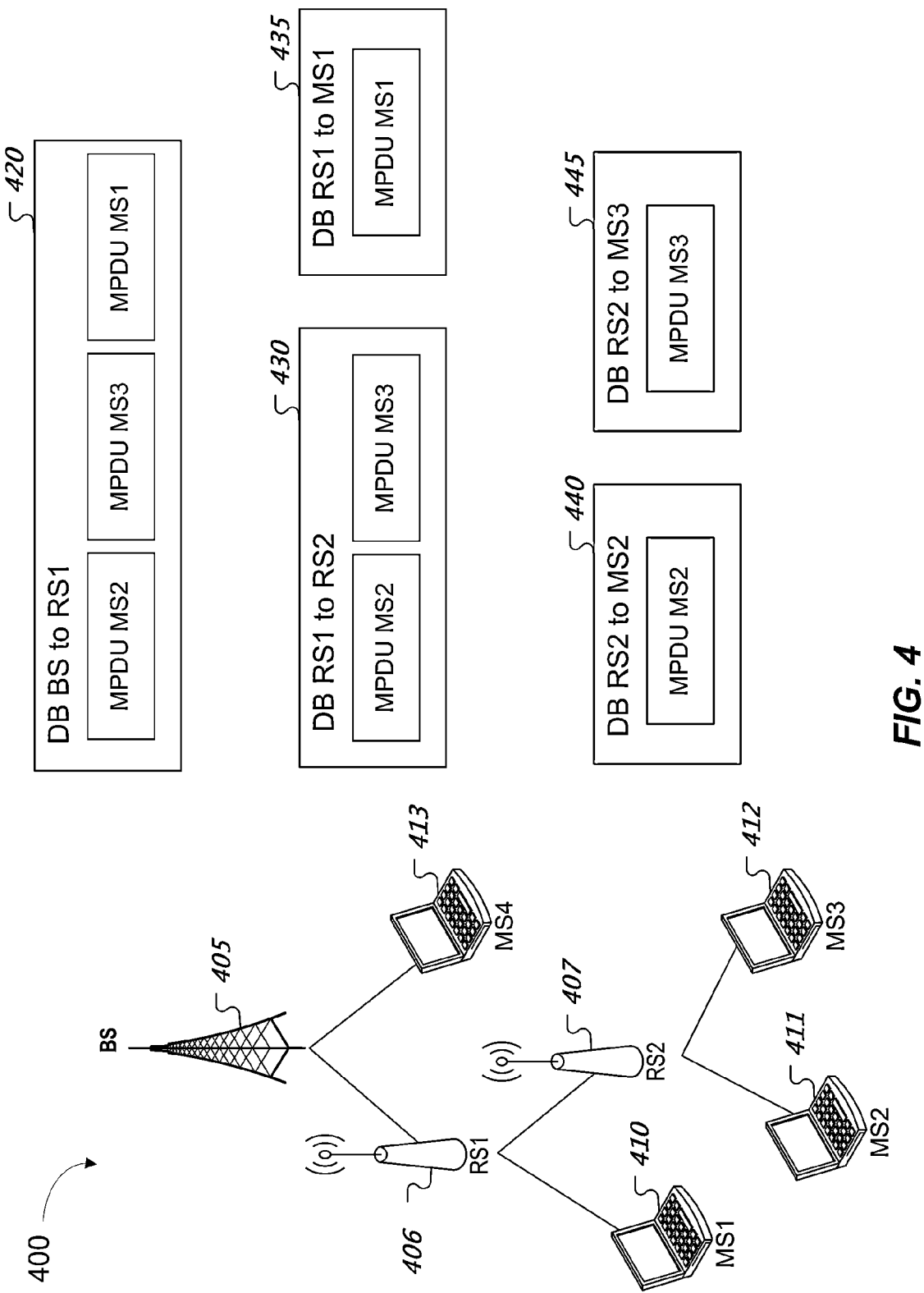
FIG. 4 shows an example of a date relay mode without tunneling.

FIG. 4 shows an example of a date relay mode without tunneling. In this mode, tunneling is not used and MAC PDUs are routed based on individual connections to MSs, e.g. a MAC PDU can be routed by using a connection ID associated with the MAC PDU. A data burst under this mode can concatenate multiple MAC PDUs with different connection IDs. System 410 is a multi-hop relay system that includes a BS 405 and relay stations RS1 406 and RS2 407. In system 400, data packets can be forwarded by BS 405 and RSs 406, 407 based on end to end connections between BS and MSs such as MS 410, 411, 412, 413. With this data relay mode, BS 405 and RSs 406, 407 can maintain a routing table for each connection or MS.

BS 405 can transmit a data burst, such as data burst 420, to RS 406. In data burst 420, MAC PDUs for MS 410, MS 411, and MS 412 are concatenated. After receiving data burst 420, RS 406 can transmit data bursts, e.g., data bursts 430, 435 to RS 407 and MS 410 respectively. After receiving data burst 430, RS 407 can forward data in burst 420 by transmitting data bursts 440, 445 to MS 411, 412. As shown in FIG. 4, as data packets traverse the relay network, a MAC PDU is forwarded to a MS without any encapsulation or de-capsulation.

Figure 5:
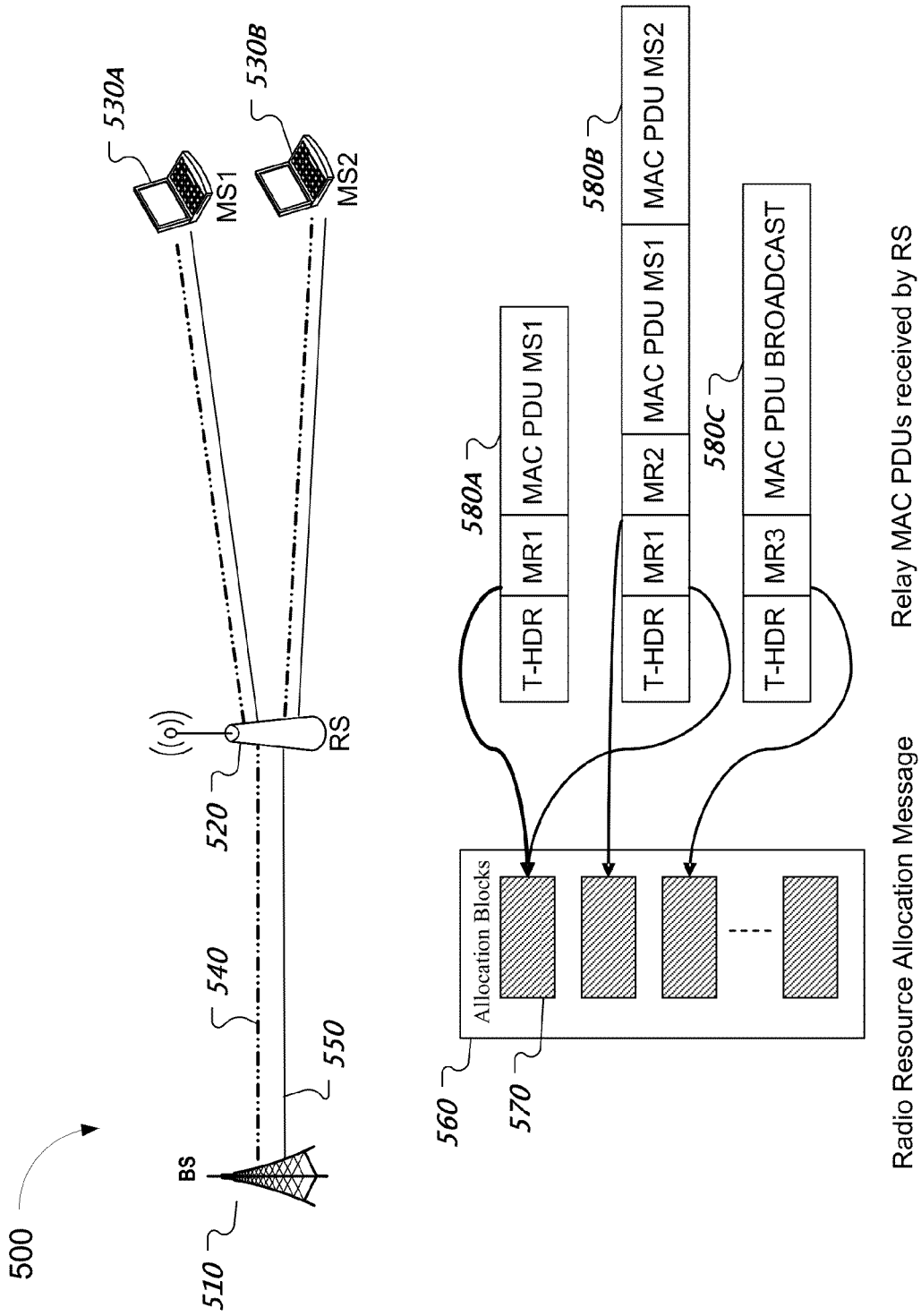
FIG. 5 shows an example of associations between data packets and a radio resource allocation message.

FIG. 5 shows an example of associations between data packets and a radio resource allocation message. These associations can be used at RSs and in conjunction with the tunneling relay mode. System 500 is multi-hop relay system. System 500 can include a BS 510, RS 520, and MSs 530A, 530B. Channel 540 is the control channel for transmitting signal messages among BS, RS and MSs. Channel 550 is the data channel for transmitting data packet/MAC PDUs. System 500 operates in a centralized scheduling mode, wherein BS 510 schedules radio resources for radio links between BS 510, RS 520, MS 530A, and 530B. At each frame, BS 510 can transmit a result of the scheduling in a RS Radio Resource Allocation message 560 to RS 520 over a control channel 540. RS 520 transmits data over a link based on the RS Radio Resource Allocation message 560.

The RS Radio Resource Allocation message 560 can include multiple Allocation Blocks 570 for transmissions in a frame. Each Allocation Block 570 includes bandwidth allocation information for a data burst. The BS 510 indicates the intended transmission frame for the RS Radio Resource Allocation message by including the target transmission frame number in the message.

Also shown in FIG. 5, the BS 510 composes relay MAC PDUs 580A, 580B, and 580C and transmits the relay MAC PDUs to RS 520 over data channel 550. For each relay MAC PDU, a tunnel header (T-HDR) can be attached to indicate which tunnel a MAC PDU belongs to. The BS 510 can schedule radio links for each relay MAC PDU from BS to MS and includes one or more mapping references in a relay MAC PDU based on the scheduling result. The mapping reference (MR) can include information to allow a RS to associate a relay MAC PDU with an allocation block in a RS Radio Resource Allocation message. For example, RS 520 receives relay MAC PDU 580A from BS 510. Relay MAC PDU 580A includes a tunnel header (T-HDR), a mapping reference (MR1), and a MAC PDU for MS1 530A. The mapping reference included by BS 510 contains information such as target transmission frame number, allocation block index, and a number of MAC PDUs. RS 520 matches a target transmission frame number extracted from MR1 in relay MAC PDU 580A with the one included in the RS Radio Resource Allocation message 560. RS 520 identifies the allocation block in message 560 by using an allocation block index retrieved from MR1.

After determining the resource allocation information for the relay MAC PDU, RS 520 transmits MAC PDU for MS1 over an access link to MS1 530A in accordance with the resource allocation information in message 560. In this example, RS 520 is the access RS, hence RS 520 removes all tunnel header and subheaders from relay MAC PDU before forwarding data over the access link to a MS. If RS 520 can not find a matching MAC PDU to transmit for an allocation block, RS 520 can ignore the allocation by not transmitting during the time specified by said allocation block.

As shown in FIG. 5, relay MAC PDU 580B and 580C provide additional examples of implementations using mapping references. In relay MAC PDU 580B, two mapping references are attached because the two MAC PDUs concatenated in relay MAC PDU 580B are scheduled to transmit in different data bursts over an access link. When RS 520 receives relay MAC PDU 580B, RS 520 first extracts mapping information from MR1 and then matches the information to an allocation block 570 in the RS Radio Resource Allocation Message 560. MR1 can include a parameter that represents a number of MAC PDUs. RS 520 determines whether the MAC PDUs from the relay MAC PDU 580B should be included in a data burst defined by an allocation block 570 based on the number of MAC PDUs in MR1. After processing MR1, RS 520 continues to extract information from MR2 to determine the allocation information for the rest of MAC PDU in relay MAC PDU 580B. Relay MAC PDU 580C includes a MAC PDU broadcast.

In the example shown in FIG. 5, both relay MAC PDU 580A and 580B includes MAC PDU associated with the same allocation block 570. RS 520 can concatenate both MAC PDUs into a data burst transmission allocated by said allocation block 570.

Figure 6A:
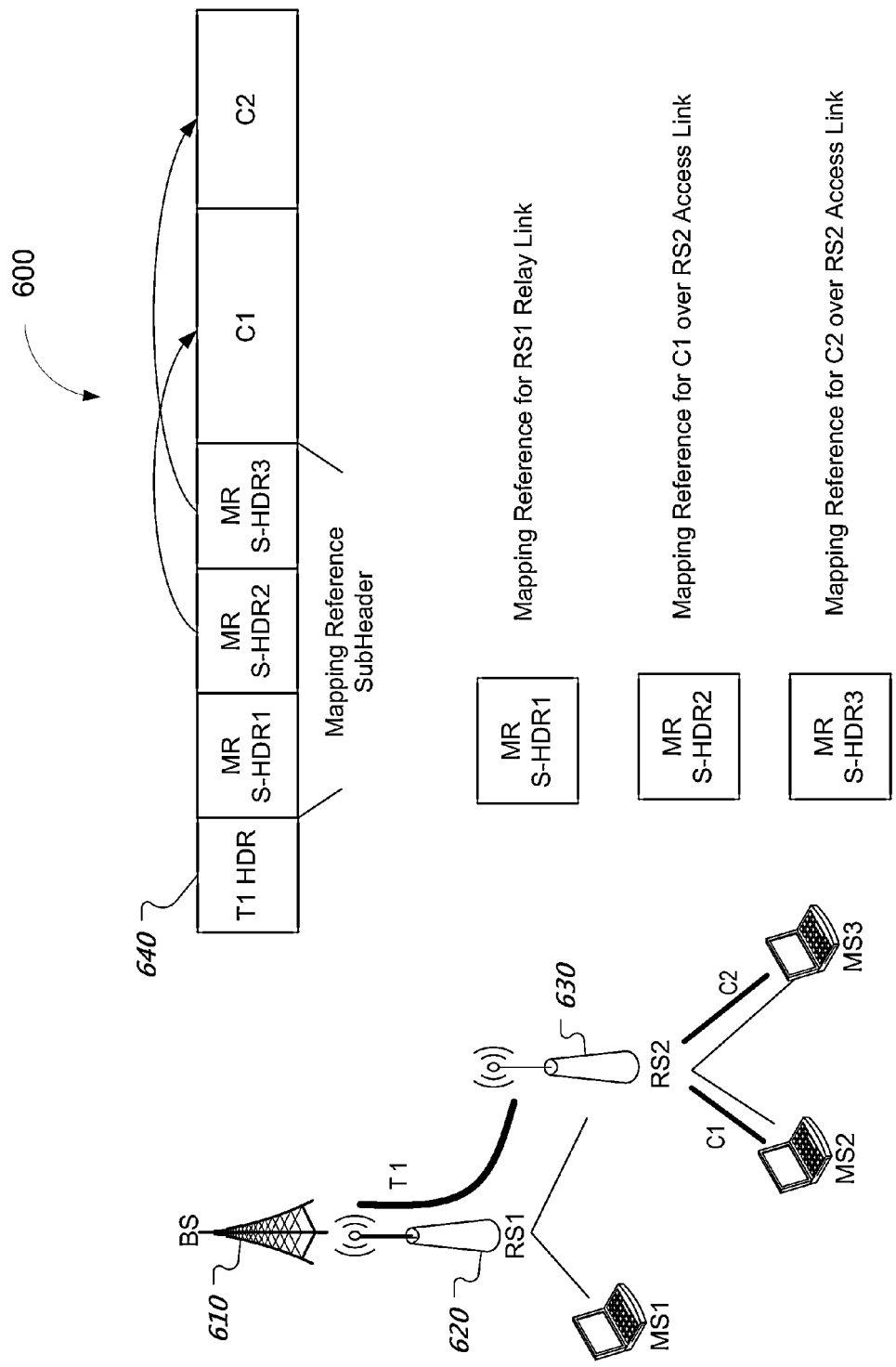
FIG. 6A shows an example of a relay MAC PDU with attached mapping references.

FIG. 6A shows an example of a relay MAC PDU with attached mapping references in a multi-hop relay system 600. System 600 includes a BS 610 and RS 620 and RS 630. RS 630 is a subordinate RS of RS 620. RS 620 communicates with MS1 over an access link and RS 630 communicates with MS2 and MS3 over another access link. In system 600, connection C1 and C2 are connections from BS 610 to MS2 and MS3 respectively. The data for C1 and C2 can be relayed to BS 610 through RS 620 and RS 630 over tunnel T1.

Relay MAC PDU 640 shows an example of relay MAC PDUs that can be received by RS 620 from BS 610. Relay MAC PDU 640 includes tunnel header T1 HDR, 3 mapping reference subheaders (MR S-HDR1, MR S-HDR2, and MR S-HDR3), and MAC PDUs for connection C1 and C2. In this example, the first mapping reference subheader MR S-HDR1 contains information for RS 620 to forward data over its relay link and the second and third mapping reference subheader MR S-HDR2 and MR S-HDR3 is used by RS 630 to forward data over an access link. In addition, BS 610 can order the mapping references in relay MAC PDU 640 such that the mapping reference for the closest RS is included first. The mapping reference(s) for access links are included last. If multiple mapping references are need, they can be included in the order of access link MAC PDUs in the relay MAC PDU. A BS can include one mapping reference per intermediate RS and one or more mapping reference for access RS.

Figure 6B:
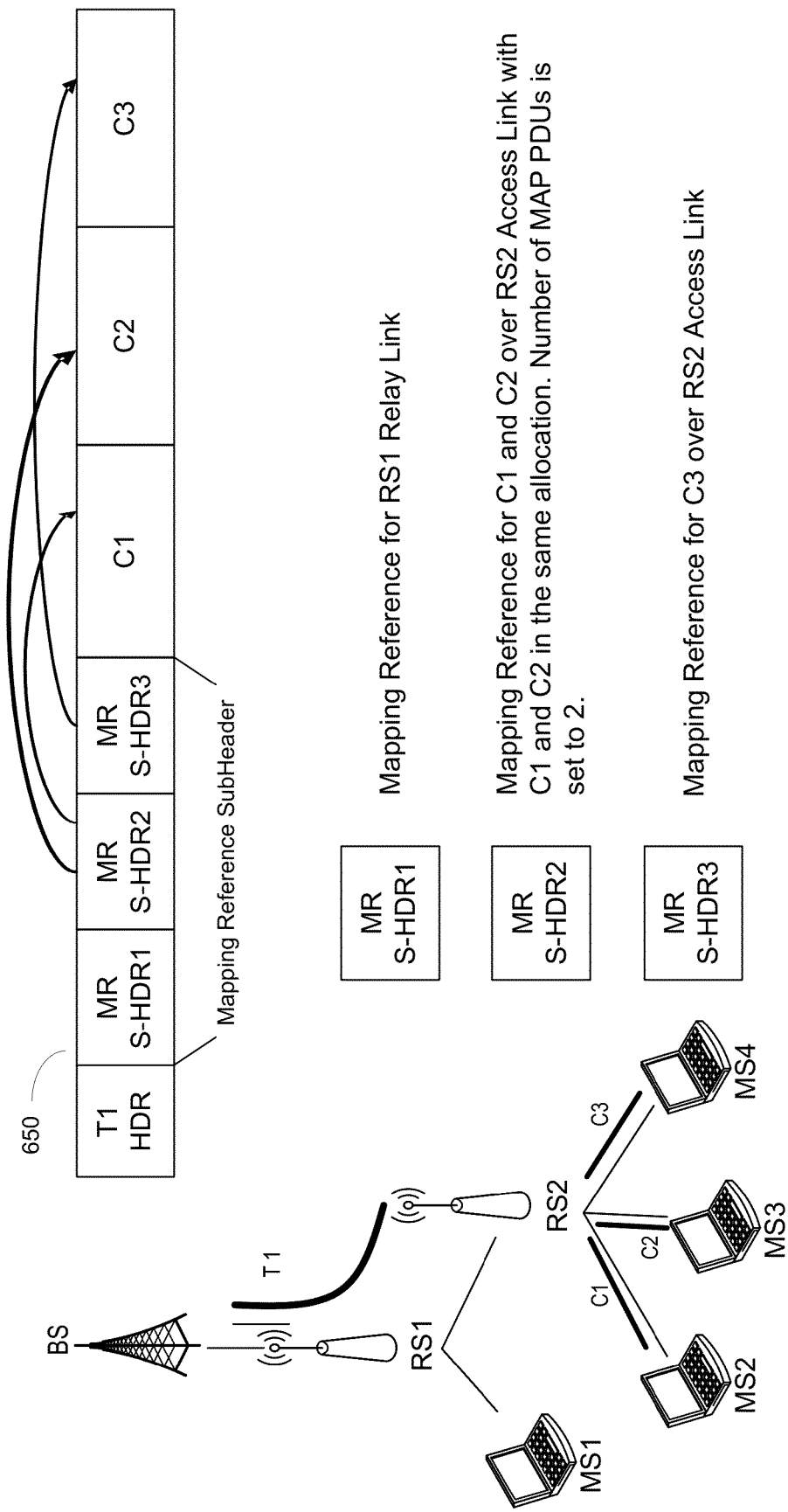
FIG. 6B shows an example of per group mapping references with in-band signaling.

FIG. 6B shows an example of per group mapping references with in-band signaling. To reduce overhead caused by attaching a mapping reference to each MAC PDU, one access link mapping reference subheader per group of access link MAC PDUs can be used instead of one per access link MAC PDU. In order to allow per group mapping reference, access link MAC PDUs can be grouped based on their allocation over an access link. For example, the access link MAC PDUs can be concatenated together if they belong to the same allocation. To support per group mapping references, a mapping reference can also include a number of MAC PDUs allocated. This number indicates the number of access link MAC PDUs belonging to the same data burst allocation. These MAC PDUs can be concatenated together within a relay MAC PDU 650 that also includes the associated mapping references.

FIG. 7 shows an example of indication flag and continuation flags in a header. These flags indicate the presence of one or more mapping references in a relay MAC PDU. In this example, the presence of the mapping reference signaling is indicated by one bit in a relay header called a MR indication bit. A continuation bit is also shown in FIG. 7 as part of the mapping reference signaling. A continuation bit can allow multiple mapping references to be included in a relay MAC PDU. Setting a continuation bit to 1 indicates that one or more mapping references are attached immediately following the current mapping reference.

Figure 8:
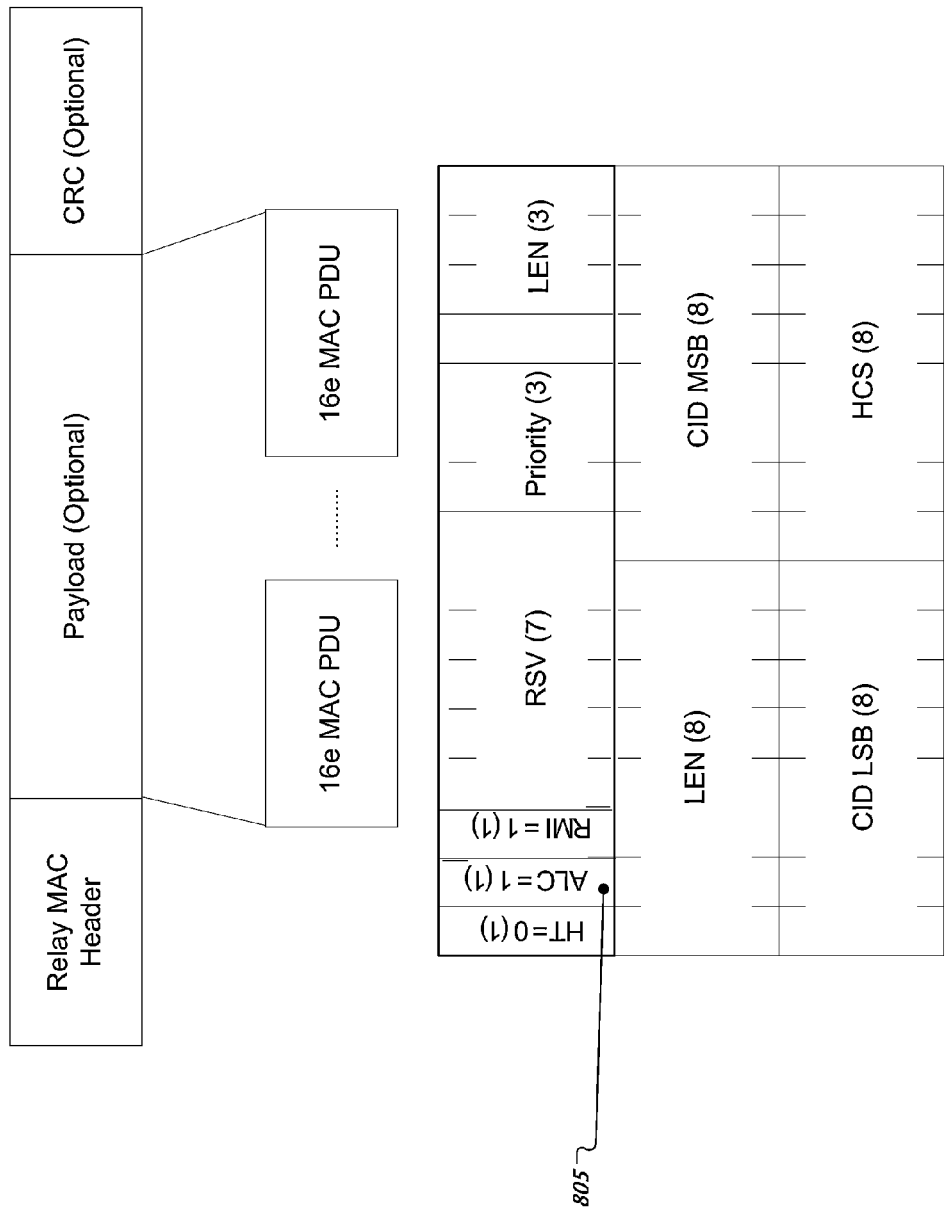
FIG. 8 shows an example of a relay MAC PDU and a relay MAC header with a bit added for mapping reference signaling.

FIG. 8 shows an example of a relay MAC PDU and a relay MAC header with a bit added for mapping reference signaling. The format of FIG. 8 is in accordance with the IEEE 802.16j/D5 standard. This standard defines the air interface specification for an OFDM and OFDMA wireless communication system. As shown in FIG. 8, the ALC bit 805 is added to indicate the inclusion of mapping reference signaling in the relay MAC PDU.

TABLE 1

| Syntax | Size | Notes |
| --- | --- | --- |
| Allocation Subhheader{ | | |
| Target Transmission Frame | 6 bits | LSB 10 bits of frame number of the frame that RS shall transmit the MAC PDU |
| Allocation Index | 6 bits | Points to a DL-MAP-IE in a RS_Relay_MAP and/or RS_Access_MAP message. Note: Because each DL-MAP message can include multiple DL-MAP-IE, this index can be used to point to the DL-MAP-IE in ascending order in DL-MAP |

TABLE 1-continued

| Syntax | Size | Notes |
|---|---|---|
| | | message. An nth allocation index can represent the nth DL-MAP-IE in a DL-MAP message |
| Number of MAC PDUs | 3 bits | Number of MAC PDUs in this allocation. Set to the number of access link MAC PDUs in a group when per group allocation subheader is used. Note: Multiple access link MAC PDUs can be grouped together when scheduled to be transmitted in the same data burst allocation in the access zone and are concatenated continuously in relay MAC PDU. When per group Allocation subheader is used, the next Allocation subheader can point at the MAC PDU immediately after the last MAC PDU of the group. |
| Continuation | 1 bits | Set to 1: another Allocation subheader follows. Set to 0: no more Allocation subheaders are attached. |
| } | | |

Table 1 shows an example format of an allocation subheader for mapping reference signaling. The signaling format can be in accordance with IEEE 802.16j/D5. An allocation subheader can provide a mapping reference to RS_Relay_MAP message and/or RS_Access_MAP message for a RS. An allocation subheader can include a target transmission frame, an allocation index, a number of MAC PDUs, and a continuation bit. If operating in a centralized scheduling mode, the MR-BS can include an allocation subheader in a relay MAC PDU which allows a RS to determine the corresponding DL_MAP_IE for the relay MAC PDU in RS_Relay_MAP and RS_Access_MAP message.

Figure 9:
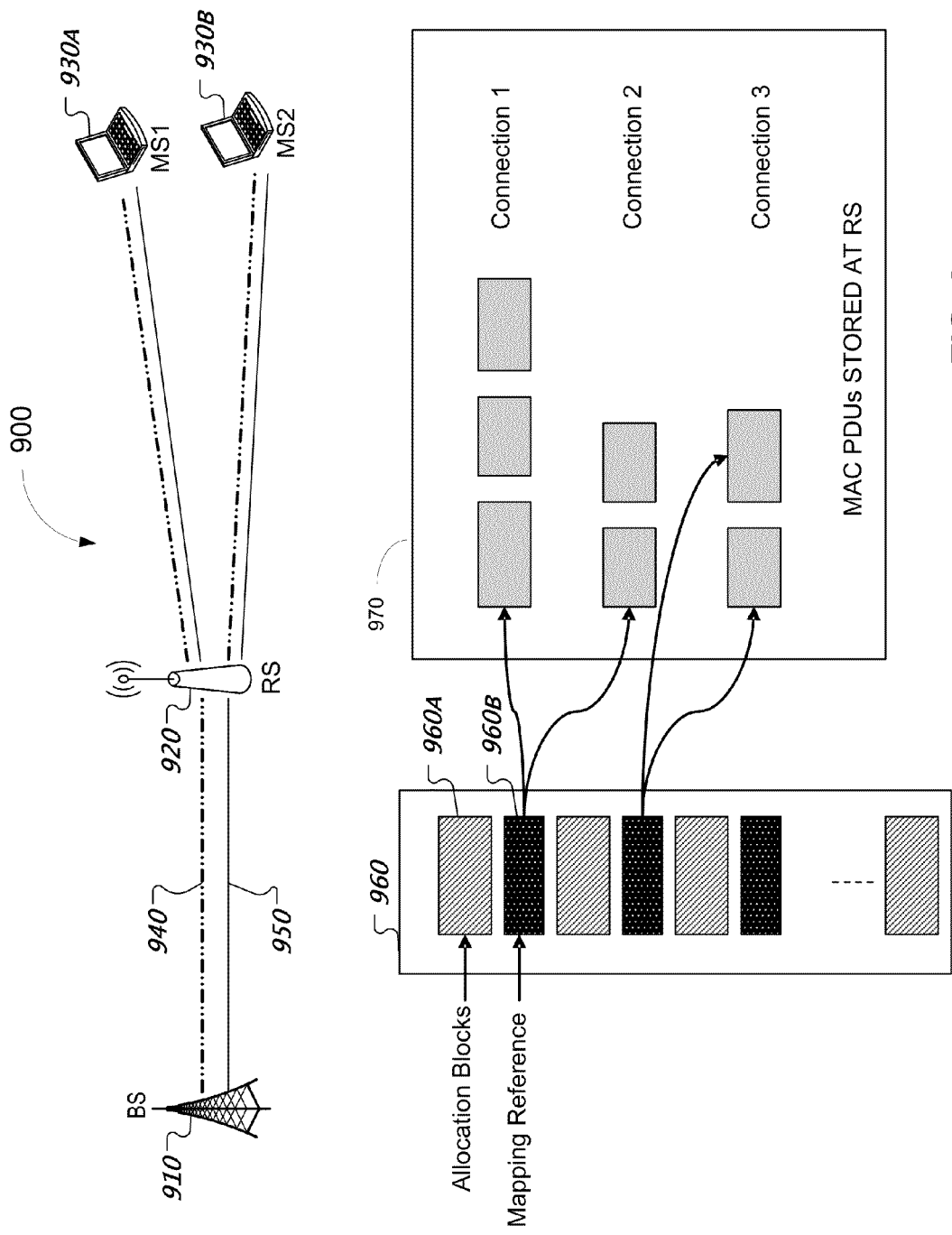
FIG. 9 shows a different example of associations between data packets and a radio resource allocation message.

FIG. 9 shows a different example of associations between data packets and a radio resource allocation message. In FIG. 9, the implementation of these associations can be used with relay data modes that do not tunnel data packets. System 900 is a multi-hop relay system that includes a BS 910, RS 920, MS 930A, and MS 930B. Channel 940 is a control channel where signal messages can be transmitted between BS 910, a RS 920, and MS 930A, 930B. Channel 950 is a data channel for the transmission of data packet/MAC PDUs. If system 900 is operating in a centralized scheduling mode, BS 910 can schedule radio resources for radio links between BS 910, RS 920, MS 930A, and MS 930B. At each frame, BS 910 can transmit one or more outputs of the scheduling in a RS Radio Resource Allocation message 960 to RS 920 over control channel 940. RS 920 can transmit data over a link in accordance with the RS Radio Resource Allocation message 960. The RS Radio Resource Allocation message 960 can include multiple allocation blocks 960A for transmissions in a frame. Each allocation block 960A can include bandwidth allocation information for a data burst. BS 910 can indicate an intended transmission frame for a data packet by including a mapping reference 960B associating that data packet with an allocation block 960A in message 960.

BS 910 can include one or more mapping references 960B with one or more allocation blocks 960A in RS Radio Resource Allocation message 960. BS 910 can attach one mapping reference per allocation block. RS 920 uses the mapping reference to determine when to transmit the data packets/MAC PDUs as specified by respective allocation blocks. A mapping reference 960B can include a connection identifier, a received frame number, and a total data amount to transmit. A connection identifier identifies a connection that carries the associated MAC PDUs. A received frame number is the frame number in which the data packets/MAC PDUs are received by the RS 920. A total data amount to transmit reflects an amount of data that can be transmitted through the associated connection. RS 920 can track transmitted data to comply with such a total data amount by matching the connection ID and received frame number of incoming data. In some implementations, the total data amount can be specified in unit of bytes. In some implementations, the total data amount can be specified in unit of number of MAC PDUs.

When RS 920 receives a MAC PDU from BS 910, RS 920 can store the MAC PDU along with reference information such as a frame number in which the MAC PDU is received and a connection ID. A RS 920 can receive a RS Radio resource allocation message 960 and can store and process data from message 960. RS 920 can identify an allocation in the radio resource allocation message 960 for a received MAC PDUs by matching the reference information of the received MAC PDU to information contained in a mapping reference. In some implementations, multiple MAC PDUs can match with a mapping reference. In such implementations, the MAC PDUs are transmitted based on the total data to be transmitted, as specified by the respective mapping reference, and in a First In First Out (FIFO) order. If no MAC PDUs with matching reference information is found, the allocation information can be ignored.

TABLE 2

| Syntax | Size | Notes |
|---|---|---|
| DL_Allocation_Reference_IE( ){ | — | — |
| Extended-2 DIUC | 4 bits | DL_Allocation_Reference_IE=0xF |
| Length | 8 bits | |
| Num_Connections | 4 bits | Number of connections included in the associated allocation |
| for(i=0;i<Num_Connections;i++) { | | |
| CID | 16 bits | CID of connection |
| Total Data Allocated | 12 bits | Total data allocated for this connection, in unit of bytes. |
| Received Frame | 4 bits | LSB of frame number where the MAC PDUs |

TABLE 2-continued

| Syntax | Size | Notes |
|---|---|---|
| } } | | are received by the RS. |

Table 2 shows an example of a mapping reference format, called a DL Allocation Reference Information Element (IE), used in mapping reference signaling. Such a signaling format can be used under wireless standards such as the IEEE 802.16j standard. In Table 2, a DL Allocation Reference IE includes one or more mapping references as given by the for-loop. A DL MAP message can include the DL Allocation IE. The MR-BS can send a DL MAP message to a RS. Each DL Allocation IE can be associated with a DL-MAP-IE which provides a DL allocation for a data burst. The RS uses the information in DL Allocation IE to determine the MAC PDUs to be concatenated in the data burst.

In some implementations, a DL allocation reference IE can be in a DL-MAP Extended-2 IE format. When the DL allocation reference IE is received, a RS can follow an associated DL-MAP-IE immediately. The associated DL-MAP-IE can include a data burst allocation. In turn, the received DL Allocation Reference IE provides a reference to one or more MAC PDUs that are to be included in the data burst. A DL allocation reference IE can include a list of allocation references. The list can include a reference for each connection that has data packets to transmit in the data burst. A MAP message can include a DL Allocation Reference IE. A MAP message can be forwarded from a MR-BS to a RS if operating in a centralized scheduling mode. In some implementations where a tunnel packet mode is used for relaying data, DL-MAP and DL R-MAP messages do not include a DL Allocation Reference IE.

In some implementations, an UL Allocation Reference IE in the format of UL-MAP extended-2 IE can be used to provide mapping references to MAC PDUs. A UL-MAP-IE, associated with a UL Allocation Reference IE, can include a data burst allocation for which the UL Allocation Reference IE provides a reference to the MAC PDUs concatenated in a data burst. The UL Allocation Reference IE can include a list of allocation references with one reference per connection that is transmitting in the data burst.

TABLE 3

| Syntax | Size | Notes |
|---|---|---|
| DL_Allocation_Reference_IE ( ){ | — | — |
| Num_Connections | 4 bits | Number of connections included in the associated allocation |
| for(i=0;i<Num_Connections;i++) { | | |
| CID | 16 bits | CID of connection |
| Num_Received_Frames | 4 bits | Number of receive frames |
| for(i=0;i<Num_Received_Frames;i++) { | | |
| Received Frame | 4 bits | LSB of frame number where the MAC PDUs are received by the RS. |
| Num_MAC PDU | 4 bits | LSB of frame number where the MAC PDUs are received by the RS. |
| } } Padding } | | |

Table 3 shows another example of a mapping reference format, called a DL Allocation Reference IE, used in mapping reference signaling. Such a signaling format can be used under wireless standards such as the IEEE 802.16j standard. RS-Relay-MAP and RS-Access-MAP messages can include a DL Allocation Reference IE using the format of Table 3. The MR-BS can send RS-Relay-MAP and/or RS-Access-MAP messages to a RS. In the DL Allocation Reference IE of Table 3, the total data to be transmitted can be defined, for example, in unit of number of MAC PDUs. The information content of a DL Allocation Reference IE can allow MAC PDUs received in different frames over the same connection to be included in one allocation block.

In some implementations of a wireless mobile relay network, methods for providing mapping of resource allocation with data packets at a RS when operating in a centralized scheduling mode can include having a BS include mapping references to a resource allocation with the relay data packets, e.g., data packets sent to a RS, when sending the relay data packets to the RS and having the RS use the mapping references to identify the resource allocation associated with the data packets. The RS can transmit the data packets in accordance with the identified resource allocation.

The mapping references attached with relay data packets can include multiple set of parameter. The parameters can include a target transmission frame, an allocation index, and/or a number of MAC PDUs. The target transmission frame can identify the frame at which the RS will transmit the data packet. The allocation index can be used to point to an allocation for a data packet if multiple allocations are included in a signaling message for a frame. The allocation index can identify the allocation based on the order of inclusion in the signaling message. In other words, an allocation index N represents the Nth allocation in the signaling message.

The BS can include multiple mapping references per relay data packet, e.g., one mapping reference per RS if the RS is required to transmit relay data packet over relay link and one or more mapping reference per access link. An order of inclusion for one or more mapping references can have relay link allocations first and then those for access link allocations to follow. The BS can order mapping references for relay link in ascending order based on the number of hops between a RS and a BS when there are multiple hops. The BS can include mapping references for an access link in the same order as the MAC PDUs in the relay data packet. An indication bit, or flag, in the header of relay data packet can be used to indicate an inclusion of a mapping reference. A continuation bit, or flag, in a mapping reference can be used to indicate additional mapping references attached to the data packet.

The RS can use a mapping reference attached with the data packet to associate the data packet with a resource allocation. The RS can remove a mapping reference related to the RS before relaying the data packet over relay link on a downlink. The RS can ignore a resource allocation if no matching data packets are found using the mapping reference.

In some implementations of a wireless mobile relay network, methods for providing mapping of resource allocation with data packets at a RS when operating in a centralized scheduling mode can include having a BS include mapping references of data packets with the resource allocation signaling when sending the resource allocation to RS and having the RS use the mapping references to determine the data packets to transmit using the resource allocation.

The mapping reference attached by BS with a resource allocation can include multiple sets of parameters. The parameters can include a connection identifier, total data allocated, and/or received frame number. A connection identifier can be used to identify the connection for a transmission of one or more data packets. The received frame number can be used to identify the frame that a data packet was received in by the RS. In some implementations, only data packets received by the RS at the received frame are considered to be correct data packets to be transmitted using an associated resource allocation.

The total data allocated can reflect an amount of data scheduled to be transmitted using an associated resource allocation, wherein the reference to the data matches the connection identifier and received frame number. The RS can store a received frame number when a data packet is received over a relay link. The RS can determine the data packets that are to be transmitted after receiving a resource allocation with the mapping reference from the BS. The RS can ignore a resource allocation if no matching data packet is found based on the mapping reference. The RS can transmit the data packets in First In First Out (FIFO) order if multiple data packets are found matching the mapping reference. The amount of data to be transmitted can be determined by the total data allocated include in a mapping reference.

This patent application presents multiple example implementations of mapping references generated by a BS to provide one or more RSs with associations between a resource allocation and data packets. The use of mapping references described is advantageous for wireless relay networks operating in a centralized scheduling mode. A relay station can associate received data packets with a received resource allocation message by using respective mapping references in order to transmit the received data packets according to a schedule determined by the BS. These implementations are designed to support the needs of different relay network tunneling modes.

Some of the implementations provide mapping references with in-band signaling. In some implementations of in-band signaling, one or more mapping references are attached to each relay data packet as a subheader or part of a header by the MR-BS and forwarded to each RS along the relay path. A mapping reference can include information which points to the resource allocation signaling block transmitted by MR-BS over control channel. For a relay path with multiple RSs, an access RS is the RS that directly communicates with MS and an intermediate RS is the one that communicates with other RSs or BS. When the data packet is relayed through multiple RSs, one mapping reference per intermediate RS can be attached. For an access RS, one or more mapping references can be included because multiple access data packets can be concatenated in one relay packets and each access date packet may have a different resource allocation block. Each RS can remove its own mapping reference(s) from the data packet before forwarding it out. Such a mechanism is suitable for a data relay mode with tunneling.

Some of the implementations provide mapping references with out-of-band signaling. In some out-of-band signaling implementations, mapping references can be attached with a resource allocation signaling message and transmitted over a control channel. A resource allocation message can include multiple allocation blocks. For each allocation block, a mapping reference is attached. The mapping reference includes information for RS to identify the data packets to be transmitted using the allocation block. The mapping reference includes information such as connection identifier between BS and MS, the frame number in which the data packet should be received by the RS and total number of data packets should be transmitted.

Other methods for providing associations between data packet and radio resource allocation message in a wireless OFDM/OFDMA system can include operating a base station to generate mapping references after performing radio resource allocation operating in centralized scheduling mode; and the mapping references are attached to relay data packets as a subheader or part of the head; and transmitted over data channel to the relay stations. The mapping reference contains information that points to an allocation block in a resource allocation message which is transmitted by the BS to the RSs over control channel. The information includes target transmission frame, allocation index and number of data packets. When a RS receives the relay data packet, that RS uses the attached mapping reference to determine the allocation block in a resource allocation message should be used for forwarding the data block. In addition, the RS removes mapping reference related to itself from the relay data packet before forwarding the packet out.

In another example, a method for providing association between data packet and radio resource allocation message in a wireless OFDM/OFDMA system can include operating a base station to generate mapping references after performing radio resource allocation operating in centralized scheduling mode; and the mapping references are included with the resource allocation message; and transmitted over control channel to the relay stations. The mapping reference contains information for RS to identify the data packets to be transmitted using the allocation block. The mapping reference includes information such as connection identifier between BS and MS, the frame number in which the data packet should be received by the RS and total number of data packets should be transmitted. When RS receives data packet over relay link, it stores the data packet as well as the frame number which the packet is received in. When RS receives a resource allocation message including mapping reference, it uses the stored frame number and connection identifier of the data packet to match with the mapping reference in determining the target packets to be transmitted.

Communication systems that implement the described techniques are also disclosed. In one example, a system includes a base station, relay station, subscriber station and access gateway where the described mechanisms for data and resource allocation association are implemented between base station and relay station.

The disclosed and other embodiments and the functional operations described in this patent application can be implemented in digital electronic circuitry, or in computer software, firmware, or hardware, including the structures disclosed in this patent application and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this patent application can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Figure 10:
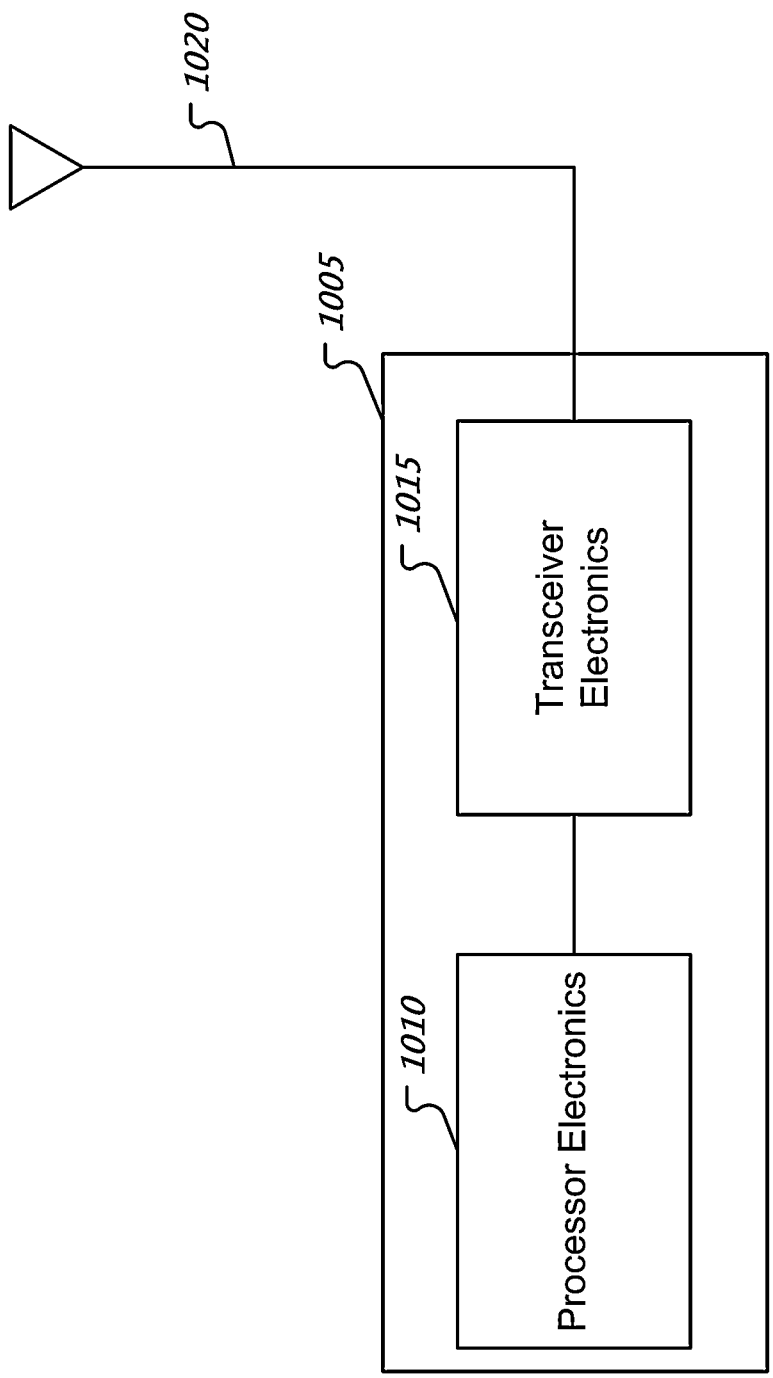
FIG. 10 shows an example of a radio station architecture.

FIG. 10 shows an example of a radio station architecture. A radio station 1005 such as a base station or a relay station can include processor electronics 1010 such as a microprocessor that implements methods such as one or more of the methods presented in this patent application. Wireless station 1005 can include transceiver electronics 1015 to send and/or receive wireless signals over a communication interface such as antenna 1020. Radio station 1005 can include other communication interfaces for transmitting and receiving data.

While this patent application contains many specifics, these should not be construed as limitations on the scope of an invention that is claimed or of what may be claimed, but rather as descriptions of features specific to particular embodiments. Certain features that are described in this patent application in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations may be made based on what is disclosed. For example, a relay station can be fixed, nomadic, or mobile.

What is claimed is:

1. A method for associating data packets with radio link resource allocations in a wireless network, the method comprising:
    scheduling radio links for transmitting data packets to one or more mobile stations via one or more relay stations, each radio links provides a wireless connection between two radio stations, the radio stations comprise a base station, the one or more relay stations, and the one or more mobile stations, wherein the one or more relay stations comprise a first relay station;
    determining a resource allocation, based on the scheduling, that at least allocates bandwidth on one of the radio links for a transmission of one or more of the data packets;
    generating one or more mapping references for one or more of the data packets associated with the resource allocation, each mapping reference links at least one data packet to a respective allocation of bandwidth; and
    transmitting the resource allocation, one or more mapping references, and data packets to the first relay station, wherein the first relay station re-transmits the data packets in accordance with the resource allocation and the one or more mapping references,
    wherein the resource allocation is transmitted separately from the one or more mapping references and the data packets, wherein at least one of the mapping references is transmitted with at least one of the data packets and the one or more mapping references comprise a target transmission frame index that identifies a transmission slot for a subsequent transmission of a data packet and an allocation index that identifies an allocation of bandwidth associated with a data packet.

2. The method of claim 1, wherein the resource allocation specifies allocations of bandwidth for respective data packets in an initial order, wherein the first relay station receives the transmitted data packets in a receive order, wherein the resource allocation and the one or more mapping references compensate for a receive order that differs from the initial order.

3. The method of claim 1, wherein the resource allocation and the one or more mapping references compensate for one or more missing data packets at the first relay station.

4. The method of claim 1, wherein the transmitting comprises transmitting the data packets separately from the one or more mapping references and the resource allocation.

5. The method of claim 4, wherein each of the mapping references comprises a connection identifier that identifies a connection and a frame number that identifies a data packet associated with the connection.

6. The method of claim 5, wherein each of the mapping references further comprises a value reflective of a total amount of data allocated for the connection.

7. The method of claim 1, wherein the transmitting comprises:
transmitting a first flag with the at least one of the data packets, the first flag indicating a presence of a mapping reference.

8. The method of claim 7, wherein the transmitting comprises:
transmitting a second flag with the at least one of the data packets, the second flag indicating a presence of an additional mapping reference.

9. The method of claim 1, wherein the resource allocation is transmitted separately from the one or more mapping references, the transmitting comprises transmitting two or more of the data packets destined for a mobile station with one of the mapping references that links the two or more data packets to the resource allocation.

10. A method for associating data packets with radio link resource allocations in a wireless network, the method comprising:
scheduling radio links for transmitting data packets to one or more mobile stations via one or more relay stations, each radio links provides a wireless connection between two radio stations, the radio stations comprise a base station, the one or more relay stations, and the one or more mobile stations, wherein the one or more relay stations comprise a first relay station;
determining a resource allocation, based on the scheduling, that at least allocates bandwidth on one of the radio links for a transmission of one or more of the data packets;
generating one or more mapping references for one or more of the data packets associated with the resource allocation, each mapping reference links at least one data packet to a respective allocation of bandwidth; and
transmitting the resource allocation, one or more mapping references, and data packets to the first relay station, wherein the first relay station re-transmits the data packets in accordance with the resource allocation and the one or more mapping references,
wherein the resource allocation is transmitted separately from the one or more mapping references and the data packets, wherein at least one of the mapping references is transmitted with at least one of the data packets, and wherein the transmitting comprises:
transmitting a first mapping reference and a second mapping reference with a first data packet, wherein the first mapping reference identifies an allocation of bandwidth for the first data packet on a first radio link, wherein the second mapping reference identifies an allocation of bandwidth for the first data packet on a second radio link, with the second radio link being subsequent to the first radio link in a transmission of the first data packet to a mobile station.

11. A method for receiving data over a first radio link and subsequently transmitting data over one or more second radio links, the method comprising:
receiving one or more resource allocations, one or more mapping references, and multiple data packets, wherein the one or more resource allocations comprise an allocation of bandwidth on a radio link, wherein the mapping references comprise information that links a data packet with an allocation of bandwidth in a resource allocation, the data packets destined for one or more mobile stations;
processing one of the data packets by locating a respective mapping reference;
identifying a resource allocation associated with the processed data packet by using the respective mapping reference; and
transmitting the processed data packet over a radio link in accordance with the identified resource allocation,
wherein the receiving comprises: receiving the mapping references with the data packets, wherein the mapping references comprise a target transmission frame index that identifies a transmission slot for a future transmission of a data packet and an allocation index that identifies an allocation of bandwidth associated with a data packet, wherein the resource allocation is received separately from the mapping references.

12. The method of claim 11, wherein the resource allocation and the one or more mapping references compensate for one or more missing data packets.

13. The method of claim 11, wherein the identified resource allocation specifies allocations of bandwidth for respective data packets in an initial order, wherein the multiple data packets are received in a receive order, wherein the identified resource allocation and the one or more mapping references compensate for a receive order that differs from the initial order.

14. The method of claim 11, wherein the receiving comprises:
receiving the mapping references with the resource allocations, wherein the mapping references comprise a connection identifier that identifies a connection and a received frame number that identifies at least one data packet associated with the connection; and
receiving the multiple data packets separately from receiving the mapping references.

15. The method of claim 14, wherein the respective mapping reference further comprises an allocation value reflective of a total amount of data allocated for the connection, the respective mapping reference being associated with the multiple data packets, the method further comprises:
identifying additional data packets that are associated with the respective mapping reference; and
transmitting the identified data packets in a first-in-first-out mode until the allocation value is reached.

16. The method of claim 14, wherein the processing comprises:
accessing a received frame number associated with the processed data packet; and
comparing the received frame number with the received frame number of the respective mapping reference.

17. The method of claim 11, wherein the transmitting comprises:
transmitting the processed data packet in the target transmission frame index specified by the respective mapping reference.

18. The method of claim 11, wherein the receiving the mapping references comprises receiving a first mapping reference and a second mapping reference with the first mapping reference and the second mapping reference being associated with the processed data packet, wherein the first mapping reference defines the respective mapping reference.

19. The method of claim 18, wherein the transmitting comprises:
  transmitting the processed data packet to a relay station; and
  transmitting the second mapping reference with the processed data packet, wherein the second mapping reference mapping reference is used by the relay station to forward the processed data packet to a mobile station in accordance with the identified resource allocation.

20. A system for wireless data communication, comprising:
  a relay station in communication with one or more mobile stations, the relay station comprises a first communication interface and a first processor communicatively coupled with the first communication interface; and
  a base station in communication with the relay station, the base station comprises a second communication interface and a second processor communicatively coupled with the second communication interface,
  wherein the second processor is configured to perform operations that comprise:
    scheduling radio links for transmitting data packets to the one or more mobile stations via the relay station;
    determining a resource allocation, based on the scheduling, that allocates bandwidth on the radio links to transmit one or more of the data packets;
    generating one or more mapping references for one or more of the data packets associated with the resource allocation, each mapping reference links at least one data packet to a respective allocation of bandwidth, wherein the one or more mapping references comprise a target transmission frame index that identifies a transmission slot for a subsequent transmission of a data packet and an allocation index that identifies an allocation of bandwidth associated with a data packet; and
    first transmitting the resource allocation, one or more mapping references, and data packets to the relay station, wherein the first transmitting comprising transmitting at least one of the mapping references with at least one of the data packets, wherein the resource allocation is transmitted separately from the one or more mapping references and the one or more data packets,
  wherein the first processor is configured to perform operations that comprise:
    receiving the resource allocation, the one or more mapping references, and multiple data packets;
    processing one of the received data packets by locating a respective mapping reference;
    identifying a resource allocation associated with the processed data packet by using the respective mapping reference; and
    second transmitting the processed data packet over a radio link in accordance with the identified resource allocation.

21. The system of claim 20, wherein the first transmitting comprises:
  transmitting the resource allocation with at least one of the mapping references; and
  transmitting the data packets separately from the resource allocation and the one or more mapping references.

22. The system of claim 21, wherein each of the mapping references comprises a connection identifier that identifies a connection and a frame number that identifies a data packet associated with the connection.

23. The system of claim 22, wherein each of the mapping references further comprises a value reflective of a total amount of data allocated for the connection.

24. The system of claim 20, wherein the first transmitting comprises:
  transmitting a first flag with the at least one of the data packets, the first flag indicating a presence of a mapping reference.

25. The system of claim 24, wherein the first transmitting comprises:
  transmitting a second flag with the at least one of the data packets, the second flag indicating a presence of an additional mapping reference.

26. The system of claim 20, wherein the first transmitting comprises:
  transmitting the resource allocation separately from the one or more mapping references and the data packets; and transmitting two or more of the data packets destined for a mobile station with one of the mapping references that links the two or more data packets to the transmitted resource allocation.

27. A system for wireless data communication, comprising:
  a relay station in communication with one or more mobile stations, the relay station comprises a first communication interface and a first processor communicatively coupled with the first communication interface; and
  a base station in communication with the relay station, the base station comprises a second communication interface and a second processor communicatively coupled with the second communication interface,
  wherein the second processor is configured to perform operations that comprise:
    scheduling radio links for transmitting data packets to the one or more mobile stations via the relay station;
    determining a resource allocation, based on the scheduling, that allocates bandwidth on the radio links to transmit one or more of the data packets;
    generating one or more mapping references for one or more of the data packets associated with the resource allocation, each mapping reference links at least one data packet to a respective allocation of bandwidth; and
    first transmitting the resource allocation, one or more mapping references, and data packets to the relay station, wherein the first transmitting comprising transmitting at least one of the mapping references with at least one of the data packets, wherein the resource allocation is transmitted separately from the one or more mapping references and the one or more data packets,
  wherein the first processor is configured to perform operations that comprise:
    receiving the resource allocation, the one or more mapping references, and multiple data packets;
    processing one of the received data packets by locating a respective mapping reference;
    identifying a resource allocation associated with the processed data packet by using the respective mapping reference; and
    second transmitting the processed data packet over a radio link in accordance with the identified resource allocation, wherein the first transmitting comprises:
transmitting a first mapping reference and a second mapping reference with a first data packet, wherein the first mapping reference identifies an allocation of bandwidth for the first data packet on a first radio link, wherein the second mapping reference identifies an allocation of bandwidth for the first data packet on a second radio link, with the second radio link being subsequent to the first radio link in a transmission of the first data packet to a mobile station.

* * * * *